US012207133B2

(12) United States Patent
Shellhammer et al.

(10) Patent No.: US 12,207,133 B2
(45) Date of Patent: *Jan. 21, 2025

(54) RESOURCE UNIT (RU) DOWNSIZING

(71) Applicant: QUALCOMM Incorporated, San Diego, CA (US)

(72) Inventors: Stephen Jay Shellhammer, Ramona, CA (US); Bin Tian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/316,543

(22) Filed: May 12, 2023

(65) Prior Publication Data
US 2023/0422092 A1 Dec. 28, 2023

Related U.S. Application Data

(63) Continuation of application No. 17/233,242, filed on Apr. 16, 2021, now Pat. No. 11,696,177.

(51) Int. Cl.
H04W 28/06 (2009.01)
H04W 28/02 (2009.01)
(Continued)

(52) U.S. Cl.
CPC ....... H04W 28/06 (2013.01); H04W 28/0268 (2013.01); H04W 72/0453 (2013.01); H04W 80/02 (2013.01)

(58) Field of Classification Search
CPC ............. H04W 28/06; H04W 28/0268; H04W 72/0453; H04W 80/02
See application file for complete search history.

(56) References Cited

U.S. PATENT DOCUMENTS 11,296,840 B1 4/2022 Jiang et al.
2020/0014509 A1* 1/2020 Asterjadhi ............ H04L 5/0041
(Continued)

FOREIGN PATENT DOCUMENTS

WO WO-2018152224 A1 8/2018

OTHER PUBLICATIONS

U.S. Appl. No. 63/105,376, Specification, filed Oct. 26, 2020, 18 Pages.
(Continued)

Primary Examiner — Yu-Wen Chang
(74) Attorney, Agent, or Firm — Holland & Hart LLP

(57) ABSTRACT

This disclosure provides methods, devices and systems for soliciting trigger-based (TB) physical layer protocol convergence protocol (PLCP) protocol data units (PPDUs). Some implementations more specifically relate to trigger frame and PPDU designs that support RU downsizing. For example, an access point (AP) may transmit a trigger frame soliciting a TB PPDU from a wireless station (STA). In some aspects, the trigger frame may carry RU allocation information indicating the allocated RU or MRU (associated with a wireless medium) and downsizing information indicating whether downsizing of the RU or MRU is permitted. If interference is detected in a portion of the wireless medium, and downsizing is permitted, the STA may transmit the TB PPDU on a downsized RU or MRU. The downsized RU or MRU includes a subset of the tones in the RU or MRU allocated by the trigger frame.

30 Claims, 20 Drawing Sheets

(51) Int. Cl.
  *H04W 72/0453* (2023.01)
  *H04W 80/02* (2009.01)

(56) References Cited

U.S. PATENT DOCUMENTS

| | | |
|---|---|---|
| 2021/0045151 A1 | 2/2021 | Chen et al. |
| 2021/0212035 A1 | 7/2021 | Son et al. |
| 2021/0250119 A1 | 8/2021 | Noh et al. |
| 2021/0266890 A1 | 8/2021 | Chu et al. |
| 2021/0274507 A1 | 9/2021 | Porat et al. |
| 2021/0409172 A1 | 12/2021 | Chen et al. |
| 2022/0116885 A1* | 4/2022 | Hu .................. H04W 52/54 |
| 2022/0132351 A1 | 4/2022 | Liu et al. |
| 2022/0132371 A1 | 4/2022 | Wu et al. |
| 2022/0338057 A1 | 10/2022 | Shellhammer et al. |

OTHER PUBLICATIONS

U.S. Appl. No. 63/105,817, Specification, filed Oct. 26, 2020, 18 Pages.
International Search Report and Written Opinion—PCT/US2022/019120—ISA/EPO—Jun. 15, 2022.
Lou H., et al., (Interdigital): "Trigger Frame and Punctured Channel Information", IEEE Draft, 11-21-0133-00-00BE-Trigger-Frame-and-Punctured-Channel-Information, IEEE-SA Mentor, Piscataway, NJ USA, vol. 802.11 EHT, 802.11be, Jan. 20, 2021 (Jan. 20, 2021), pp. 1-10, XP068175929, the whole document.
Ding Y., et al., "RU Adaptation in TB UL MU Transmission", doc.: IEEE 802.11-20/1886r1, Nov. 27, 2020, pp. 1-8.
Porat R., "Enabling Punctured Subbands in TB PPDU", doc.: IEEE 802.11-20/xxxr0, Mar. 3, 2020, pp. 1-6.

* cited by examiner

| Bit Position: | B0    B3 | B4    B15 | B16 | B17 | B18 B19 | B20 B21 | B22 | B23    B25 |
|---|---|---|---|---|---|---|---|---|
| | Trigger Type | UL Length | More TF | CS Required | UL BW | GI And HE-LTF Type | Reserved | Number Of EHT-LTF Symbols And Midamble Periodicity |
| # Bits: | 4 | 12 | 1 | 1 | 2 | 2 | 1 | 3 |

| Bit Position: | B26 | B27 | B28 B33 | B34 B35 | B36 | B37 B52 | B53 | B54 |
|---|---|---|---|---|---|---|---|---|
| | Reserved | LDPC Extra Symbol Segment | AP Tx Power | Pre-FEC Padding Factor | PE Disambiguity | UL Spatial Reuse | Reserved | HE/EHT P160 |
| # Bits: | 1 | 1 | 6 | 2 | 1 | 16 | 1 | 1 |

| Bit Position: | B56    B62 | B63 | |
|---|---|---|---|
| | Reserved | Reserved | Trigger Dependent Common Info |
| # Bits: | 7 | 1 | variable |

*Figure 11*

| Bit Position: | B0 B11 | B12 B14 | B15 B16 | B17 B20 | B21 B24 | B25 B36 | B37 B39 | B40 B47 |
|---|---|---|---|---|---|---|---|---|
| | AID12 | PHY Version ID | UL Bandwidth Extension | Spatial Reuse 1 | Spatial Reuse 2 | U-SIG Disregard And Validate | Reserved | Reserved |
| # Bits: | 12 | 3 | 2 | 4 | 4 | 12 | 3 | 8 |

RESOURCE UNIT (RU) DOWNSIZING

CROSS REFERENCE

The present Application for Patent is a continuation of U.S. Non-Provisional patent application Ser. No. 17/233,242, filed on Apr. 16, 2021, assigned to the assignee hereof, and expressly incorporated by reference herein.

TECHNICAL FIELD

This disclosure relates generally to wireless communication, and more specifically to downsizing resource units (RUs) used in wireless communications.

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

Existing versions of the IEEE 802.11 standard support trigger-based uplink communications. In particular, the IEEE 802.11ax amendment of the IEEE 802.11 standard defines a trigger frame format which can be used to solicit the transmission of a trigger-based (TB) physical layer convergence protocol (PLCP) data unit (PPDU) from one or more STAs. The trigger frame allocates resources to one or more STAs for the transmission of the TB PPDU and indicates how the TB PPDU is to be configured for transmission. For example, the trigger frame may indicate a resource unit (RU) that is allocated for transmission in the TB PDDU. The RU represents a series of tones or subcarriers spanning a wireless channel on which the TB PPDU is to be transmitted. However, the TB PPDU cannot be transmitted, in accordance with existing versions of the IEEE 802.11 standard, if any portion of the wireless channel is busy or otherwise unavailable.

New WLAN communication protocols are being developed to enable enhanced WLAN communication features such as, for example, increases in bandwidth as well as support for multiple resource unit (MRU) allocations. As a result, trigger frames may allocate larger RUs (or MRUs) for TB PPDUs. Increasing the bandwidth of the wireless channel also increases the likelihood of interference on any portion of the wireless channel. Thus, new trigger frame and PPDU formats are needed to provide greater flexibility in medium utilization.

SUMMARY

The systems, methods and devices of this disclosure each have several innovative aspects, no single one of which is solely responsible for the desirable attributes disclosed herein.

One innovative aspect of the subject matter described in this disclosure can be implemented as a method of wireless communication. The method may be performed by a wireless communication device, and may include receiving a trigger frame soliciting a trigger-based (TB) physical layer convergence protocol (PLCP) protocol data unit (PPDU) from the wireless communication device, the trigger frame including a user information field carrying resource unit (RU) allocation information indicating a plurality of tones allocated for the TB PPDU and carrying downsizing information indicating whether downsizing of the plurality of tones is permitted, the plurality of tones representing a first RU or a first multiple resource unit (MRU) associated with a wireless medium; determining that one or more tones of the plurality of tones are unavailable, the one or more unavailable tones being associated with a portion of the wireless medium in which there is interference; and selectively transmitting the TB PPDU on a subset of tones of the plurality of tones based on the downsizing information, the subset of tones representing a second RU or a second MRU that is smaller than the first RU or the first MRU. In some aspects, the downsizing information may be indicated by a value of a downsizing bit in the user information field. In some other aspects, the RU allocation information and the downsizing information are collectively indicated by a value of an RU allocation subfield of the user information field In some implementations, the method further includes receiving RU guarantee information indicating one or more tones of the plurality of tones guaranteed to be associated with the TB PPDU; and selecting the subset of tones to exclude the one or more unavailable tones and include at least the one or more guaranteed tones. In some aspects, the RU guarantee information may be carried in a common information field that precedes the user information field in the trigger frame, where the common information field carries information that is common to each user associated with the trigger frame. In some other aspects, the RU guarantee information may be carried in a special user information field of the trigger frame, where the special user information field is identified by an association identifier (AID) value not assigned to any wireless communication devices associated with the same basic service set (BSS) as the wireless communication device. Still further, in some aspects, the RU guarantee information may be carried in a management frame received prior to the trigger frame.

In some implementations, the RU guarantee information may include a bitmap, where each bit of the bitmap indicates whether a respective subchannel of a wireless channel is associated with the one or more guaranteed tones. In some other implementations, the RU guarantee information may include one or more pairs of bits, where each of the one or more pairs of bits indicates which 20 MHz subchannel of a respective 80 MHz channel is associated with the one or more guaranteed tones. In some other implementations, the RU guarantee information may include one or more pairs of bits, where each of the one or more pairs of bits indicates which 40 MHz subchannel of a respective 160 MHz channel is associated with the one or more guaranteed tones. Still further, in some implementations, the RU guarantee information may map to one of a plurality of entries in a lookup table (LUT), where each entry in the LUT indicates a respective combination of one or more subchannels of a wireless channel that are associated with the one or more guaranteed tones.

In some implementations, the TB PPDU may include a physical layer preamble having a universal signal field (U-SIG) that carries downsized signaling information indicating the subset of tones. In some aspects, the downsized signaling information may map to one of a plurality of entries in an LUT, where each entry in the LUT indicates a respective RU or MRU. In some other aspects, the downsized signaling information may indicate the remaining tones of the plurality of tones that are not included in the subset, where the remaining tones represent a third RU or a third MRU.

Another innovative aspect of the subject matter described in this disclosure can be implemented in a wireless communication device. In some implementations, the wireless communication device may include at least one modem, at least one processor communicatively coupled with the at least one modem, and at least one memory communicatively coupled with the at least one processor and storing processor-readable code. In some implementations, execution of the processor-readable code by the at least one processor causes the wireless communication device to perform operations including receiving a trigger frame soliciting a TB PPDU from the wireless communication device, the trigger frame including a user information field carrying RU allocation information indicating a plurality of tones allocated for the TB PPDU and carrying downsizing information indicating whether downsizing of the plurality of tones is permitted, the plurality of tones representing a first RU or a first MRU associated with a wireless medium; determining that one or more tones of the plurality of tones are unavailable, the one or more unavailable tones being associated with a portion of the wireless medium in which there is interference; and selectively transmitting the TB PPDU on a subset of tones of the plurality of tones based on the downsizing information, the subset of tones representing a second RU or a second MRU that is smaller than the first RU or the first MRU.

Another innovative aspect of the subject matter described in this disclosure can be implemented as a method of wireless communication. The method may be performed by a wireless communication device, and may include transmitting a trigger frame soliciting a TB PPDU, where the trigger frame includes a user information field carrying RU allocation information indicating a plurality of tones allocated for the TB PPDU and carrying downsizing information indicating that downsizing of the plurality of tones is permitted, where the plurality of tones represents a first RU or a first MRU; and receiving the TB PPDU on a subset of tones of the plurality of tones responsive to the trigger frame, where the subset of tones represents a second RU or a second MRU that is smaller than the first RU or the first MRU. In some aspects, the downsizing information may be indicated by a value of a downsizing bit in the user information field. In some other aspects, the RU allocation information and the downsizing information are collectively indicated by a value of an RU allocation subfield of the user information field.

In some implementations, the method further includes transmitting RU allocation information indicating one or more tones of the plurality of tones guaranteed to be associated with the TB PPDU, the subset of tones including at least the one or more guaranteed tones. In some aspects, the RU guarantee information may be carried in a common information field that precedes the user information field in the trigger frame, where the common information field carries information that is common to each user associated with the trigger frame. In some other aspects, the RU guarantee information may be carried in a special user information field of the trigger frame, where the special user information field is identified by an AID value not assigned to any wireless communication devices associated with the wireless communication device. Still further, in some aspects, the RU guarantee information may be carried in a management frame transmitted prior to the trigger frame.

In some implementations, the RU guarantee information may include a bitmap, where each bit of the bitmap indicates whether a respective subchannel of a wireless channel is associated with the one or more guaranteed tones. In some other implementations, the RU guarantee information may include one or more pairs of bits, where each of the one or more pairs of bits indicates which 20 MHz subchannel of a respective 80 MHz channel is associated with the one or more guaranteed tones. In some other implementations, the RU guarantee information may include one or more pairs of bits, where each of the one or more pairs of bits indicates which 40 MHz subchannel of a respective 160 MHz channel is associated with the one or more guaranteed tones. Still further, in some implementations, the RU guarantee information may map to one of a plurality of entries in an LUT, where each entry in the LUT indicates a respective combination of one or more subchannels of a wireless channel that are associated with the one or more guaranteed tones.

In some implementations, the TB PPDU may include a physical layer preamble having a U-SIG that carries downsized signaling information indicating the subset of tones. In some aspects, the downsized signaling information may map to one of a plurality of entries in an LUT, where each entry in the LUT indicates a respective RU or MRU. In some other aspects, the downsized signaling information may indicate the remaining tones of the plurality of tones that are not included in the subset, where the remaining tones represent a third RU or a third MRU.

Another innovative aspect of the subject matter described in this disclosure can be implemented in a wireless communication device. In some implementations, the wireless communication device may include at least one modem, at least one processor communicatively coupled with the at least one modem, and at least one memory communicatively coupled with the at least one processor and storing processor-readable code. In some implementations, execution of the processor-readable code by the at least one processor causes the wireless communication device to perform operations including transmitting a trigger frame soliciting a TB PPDU, where the trigger frame includes a user information field carrying RU allocation information indicating a plurality of tones allocated for the TB PPDU and carrying downsizing information indicating that downsizing of the plurality of tones is permitted, where the plurality of tones represents a first RU or a first MRU; and receiving the TB PPDU on a subset of tones of the plurality of tones responsive to the trigger frame, where the subset of tones represents a second RU or a second MRU that is smaller than the first RU or the first MRU.

BRIEF DESCRIPTION OF THE DRAWINGS

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

FIG. 11 shows a common information field for a trigger frame formatted in accordance with an existing trigger frame format.

FIG. 13 shows a special user information field for a trigger frame formatted in accordance with an existing trigger frame format.

Like reference numbers and designations in the various drawings indicate like elements.

DETAILED DESCRIPTION

Figure 1:
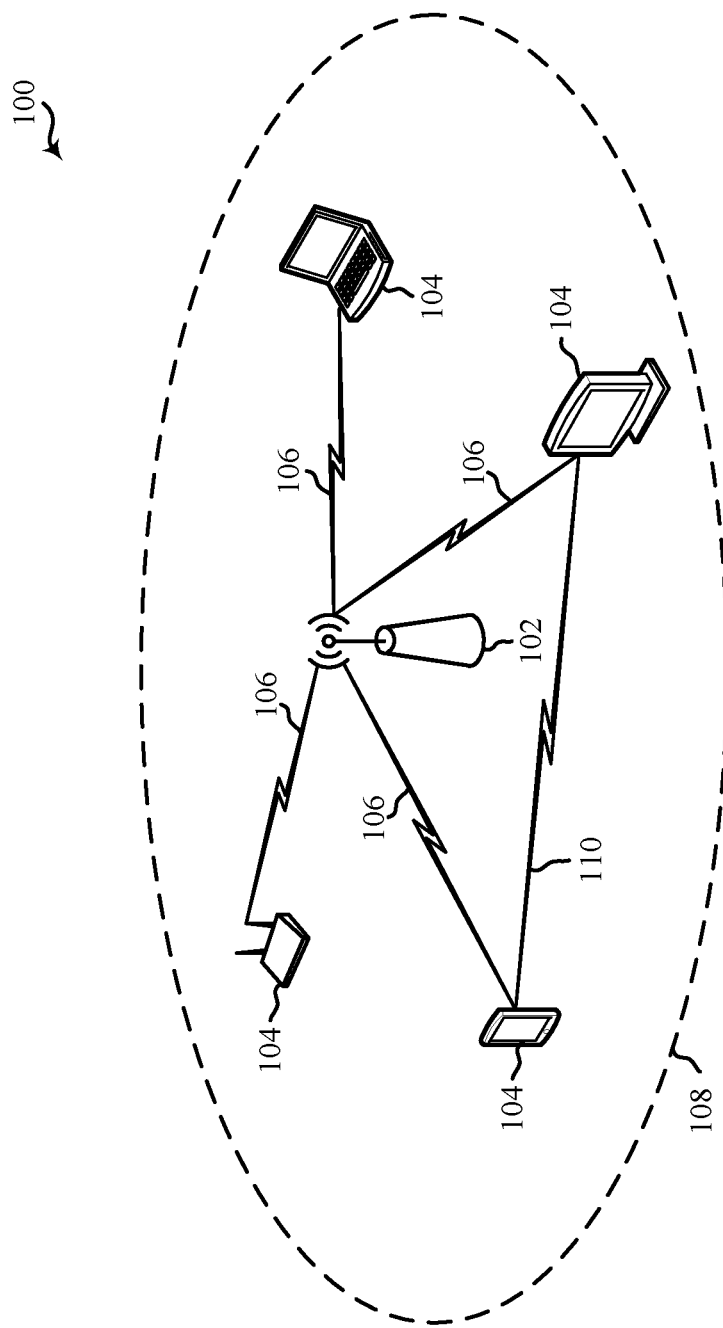
FIG. 1 shows a pictorial diagram of an example wireless communication network.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

Various aspects relate generally to trigger-based communications that support new wireless communication protocols, and more particularly, to trigger frame and physical layer convergence protocol (PLCP) protocol data unit (PPDU) designs that support resource unit (RU) downsizing. As used herein, the term "RU downsizing" refers to the transmission of a TB PPDU spanning an RU or a multiple RU (MRU) that is smaller than the RU or MRU originally allocated in the TB PPDU. For example, an access point (AP) may transmit a trigger frame soliciting a TB PPDU from a wireless station (STA). In some aspects, the trigger frame may carry RU allocation information indicating the allocated RU or MRU (associated with a wireless medium) and downsizing information indicating whether downsizing of the RU or MRU is permitted. If interference is detected in a portion of the wireless medium (such as due to the medium being busy), and downsizing is permitted, the STA may transmit the TB PPDU on tones (or "subcarriers") spanning a downsized RU or MRU. The downsized RU or MRU includes a subset of the tones in the RU or MRU allocated by the trigger frame. In some aspects, the downsized RU or MRU may be required to include one or more guaranteed tones. The guaranteed tones span a portion of the wireless medium on which the AP expects to receive signaling for the TB PPDU such as, for example, in a physical layer (PHY) preamble. Thus, in some aspects, the STA may provide signaling for the downsized RU or MRU in the PHY preamble of the TB PPDU.

Particular implementations of the subject matter described in this disclosure can be implemented to realize one or more of the following potential advantages. RU downsizing provides greater flexibility in medium utilization for trigger-based communications. By allowing a STA to transmit a TB PPDU on a subset of the tones allocated by a trigger frame, aspects of the present disclosure may support increases in network throughput achievable in accordance with the IEEE 802.11be amendment, and future generations, of the IEEE 802.11 standard. For example, if only a portion of the wireless medium is busy or unavailable, the STA may transmit the TB PPDU on tones spanning a downsized RU or MRU that avoids the busy portion. As a result, the TB PPDU may adapt to the conditions of the wireless medium. By requiring the downsized RU or MRU to include one or more guaranteed tones, aspects of the present disclosure may ensure that an AP is able to detect the TB PPDU and recover the information carried therein. For example, the PHY preamble of the TB PPDU can be decoded in its entirety from the guaranteed tones. Thus, by signaling the downsized RU or MRU in the PHY preamble, aspects of the present disclosure may ensure that the AP can identify the downsized RU or MRU within the TB PPDU by observing only the guaranteed tones.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba and 802.11be). The WLAN 100 may include numerous wireless communication devices such as an access point (AP) 102 and multiple stations (STAs) 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 106 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 108 (hereinafter also referred to as a "Wi-Fi link"), or to maintain a communication link 108, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 108.

The APs 102 and STAs 104 may function and communicate (via the respective communication links 108) according to the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 700 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Access to the shared wireless medium is generally governed by a distributed coordination function (DCF). With a DCF, there is generally no centralized master device allocating time and frequency resources of the shared wireless medium. On the contrary, before a wireless communication device, such as an AP 102 or a STA 104, is permitted to transmit data, it must wait for a particular time and then contend for access to the wireless medium. In some implementations, the wireless communication device may be configured to implement the DCF through the use of carrier sense multiple access (CSMA) with collision avoidance (CA) (CSMA/CA) techniques and timing intervals. Before transmitting data, the wireless communication device may perform a clear channel assessment (CCA) and determine that the appropriate wireless channel is idle. The CCA includes both physical (PHY-level) carrier sensing and virtual (MAC-level) carrier sensing. Physical carrier sensing is accomplished via a measurement of the received signal strength of a valid frame, which is then compared to a threshold to determine whether the channel is busy. For example, if the received signal strength of a detected preamble is above a threshold, the medium is considered busy. Physical carrier sensing also includes energy detection. Energy detection involves measuring the total energy the wireless communication device receives regardless of whether the received signal represents a valid frame. If the total energy detected is above a threshold, the medium is considered busy. Virtual carrier sensing is accomplished via the use of a network allocation vector (NAV), an indicator of a time when the medium may next become idle. The NAV is reset each time a valid frame is received that is not addressed to the wireless communication device. The NAV effectively serves as a time duration that must elapse before the wireless communication device may contend for access even in the absence of a detected symbol or even if the detected energy is below the relevant threshold.

Some APs and STAs may be configured to implement spatial reuse techniques. For example, APs and STAs configured for communications using IEEE 802.11ax or 802.11be may be configured with a BSS color. APs associated with different BSSs may be associated with different BSS colors. If an AP or a STA detects a wireless packet from another wireless communication device while contending for access, the AP or STA may apply different contention parameters based on whether the wireless packet is transmitted by, or transmitted to, another wireless communication device within its BSS or from a wireless communication device from an overlapping BSS (OBSS), as determined by a BSS color indication in a preamble of the wireless packet. For example, if the BSS color associated with the wireless packet is the same as the BSS color of the AP or STA, the AP or STA may use a first received signal strength indication (RSSI) detection threshold when performing a CCA on the wireless channel. However, if the BSS color associated with the wireless packet is different than the BSS color of the AP or STA, the AP or STA may use a second RSSI detection threshold in lieu of using the first RSSI detection threshold when performing the CCA on the wireless channel, the second RSSI detection threshold being greater than the first RSSI detection threshold. In this way, the requirements for winning contention are relaxed when interfering transmissions are associated with an OBSS.

Figure 2A:
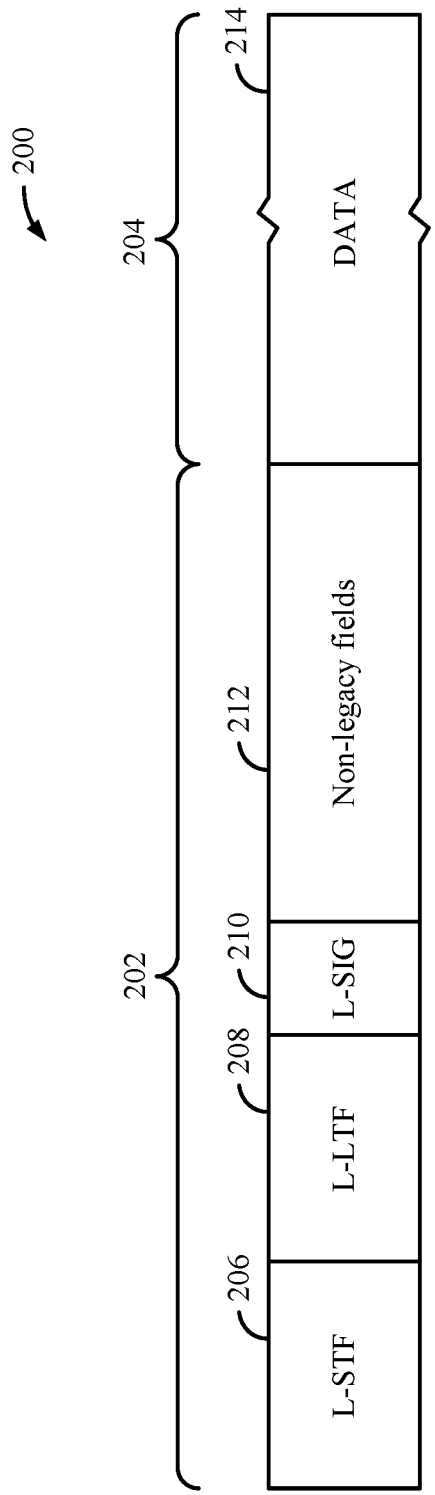
FIG. 2A shows an example protocol data unit (PDU) usable for communications between an access point (AP) and one or more wireless stations (STAs).

FIG. 2A shows an example protocol data unit (PDU) 200 usable for wireless communication between an AP 102 and one or more STAs 104. For example, the PDU 200 can be configured as a PPDU. As shown, the PDU 200 includes a PHY preamble 202 and a PHY payload 204. For example, the preamble 202 may include a legacy portion that itself includes a legacy short training field (L-STF) 206, which may consist of two BPSK symbols, a legacy long training field (L-LTF) 208, which may consist of two BPSK symbols, and a legacy signal field (L-SIG) 210, which may consist of two BPSK symbols. The legacy portion of the preamble 202 may be configured according to the IEEE 802.11a wireless communication protocol standard. The preamble 202 may also include a non-legacy portion including one or more non-legacy fields 212, for example, conforming to an IEEE wireless communication protocol such as the IEEE 802.11ac, 802.11ax, 802.11be or later wireless communication protocol protocols.

The L-STF 206 generally enables a receiving device to perform automatic gain control (AGC) and coarse timing and frequency estimation. The L-LTF 208 generally enables a receiving device to perform fine timing and frequency estimation and also to perform an initial estimate of the wireless channel. The L-SIG 210 generally enables a receiving device to determine a duration of the PDU and to use the determined duration to avoid transmitting on top of the PDU. For example, the L-STF 206, the L-LTF 208 and the L-SIG 210 may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of medium access control (MAC) protocol data units (MPDUs) or an aggregated MPDU (A-MPDU).

Figure 2B:
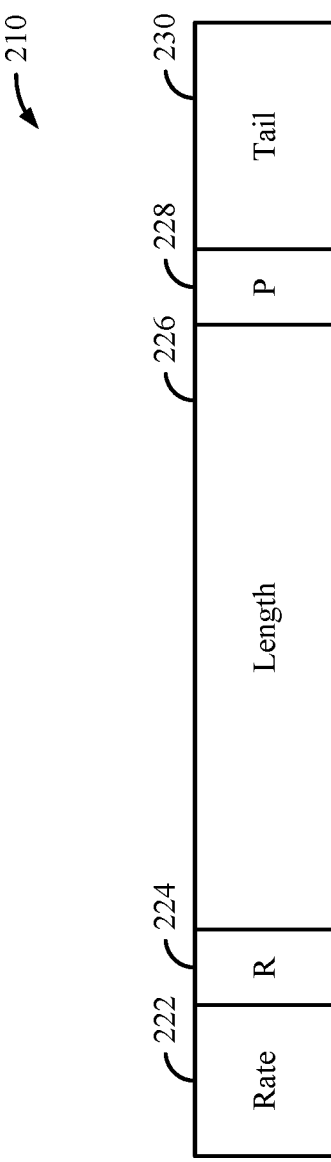
FIG. 2B shows an example field in the PDU of FIG. 2A.

FIG. 2B shows an example L-SIG 210 in the PDU 200 of FIG. 2A. The L-SIG 210 includes a data rate field 222, a reserved bit 224, a length field 226, a parity bit 228, and a tail field 230. The data rate field 222 indicates a data rate (note that the data rate indicated in the data rate field 212 may not be the actual data rate of the data carried in the payload 204). The length field 226 indicates a length of the packet in units of, for example, symbols or bytes. The parity bit 228 may be used to detect bit errors. The tail field 230 includes tail bits that may be used by the receiving device to terminate operation of a decoder (for example, a Viterbi decoder). The receiving device may utilize the data rate and the length indicated in the data rate field 222 and the length field 226 to determine a duration of the packet in units of, for example, microseconds (its) or other time units.

Figure 3:
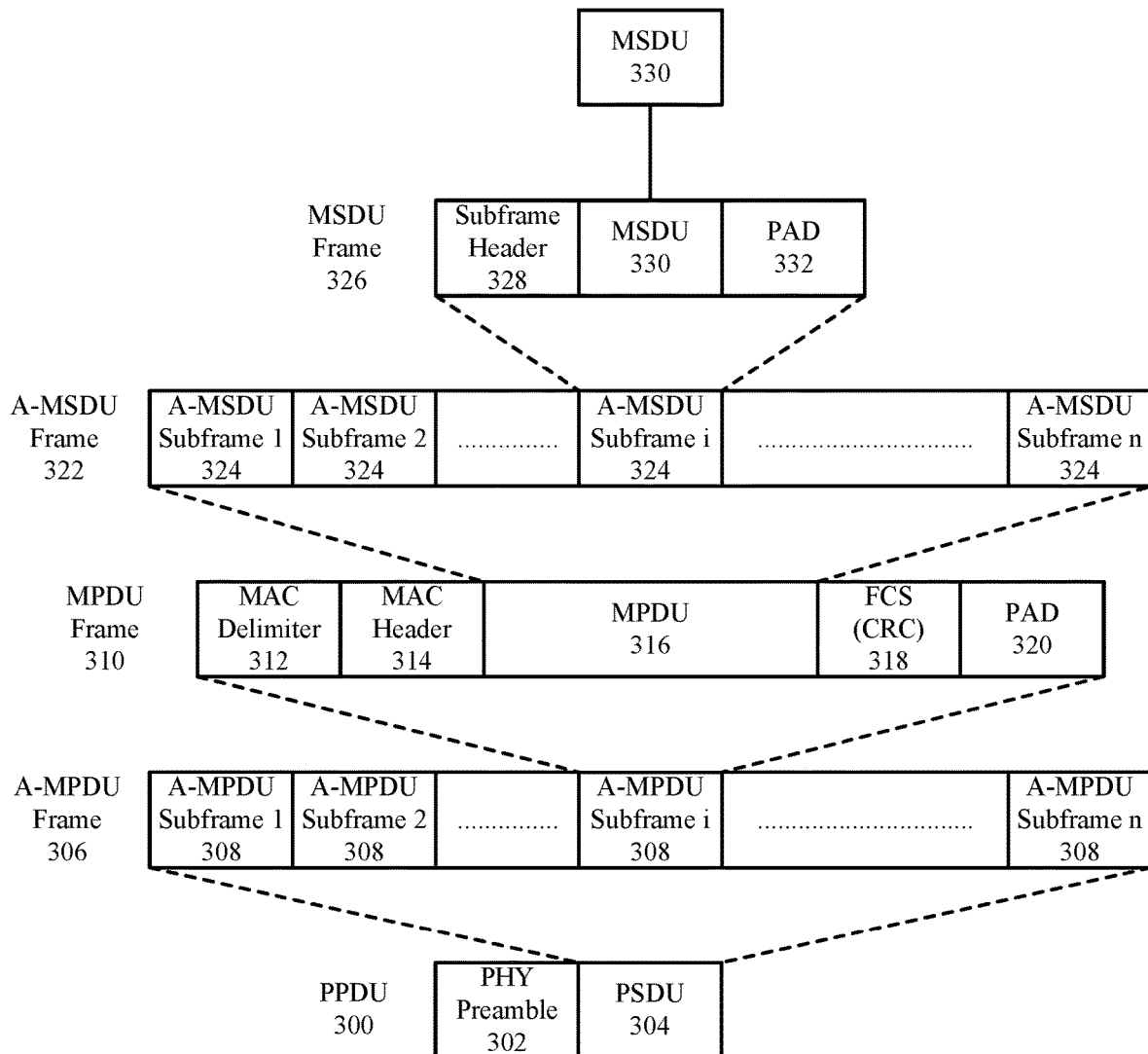
FIG. 3 shows an example physical layer convergence protocol (PLCP) protocol data unit (PPDU) usable for communications between an AP and one or more STAs.

FIG. 3 shows an example PPDU 300 usable for communications between an AP 102 and one or more STAs 104. As described above, each PPDU 300 includes a PHY preamble 302 and a PSDU 304. Each PSDU 304 may represent (or "carry") one or more MAC protocol data units (MPDUs) 316. For example, each PSDU 304 may carry an aggregated MPDU (A-MPDU) 306 that includes an aggregation of multiple A-MPDU subframes 308. Each A-MPDU subframe 306 may include an MPDU frame 310 that includes a MAC delimiter 312 and a MAC header 314 prior to the accompanying MPDU 316, which comprises the data portion ("payload" or "frame body") of the MPDU frame 310. Each MPDU frame 310 may also include a frame check sequence (FCS) field 318 for error detection (for example, the FCS field may include a cyclic redundancy check (CRC)) and padding bits 320. The MPDU 316 may carry one or more MAC service data units (MSDUs) 316. For example, the MPDU 316 may carry an aggregated MSDU (A-MSDU) 322 including multiple A-MSDU subframes 324. Each A-MSDU subframe 324 contains a corresponding MSDU 330 preceded by a subframe header 328 and in some cases followed by padding bits 332.

Referring back to the MPDU frame 310, the MAC delimiter 312 may serve as a marker of the start of the associated MPDU 316 and indicate the length of the associated MPDU 316. The MAC header 314 may include multiple fields containing information that defines or indicates characteristics or attributes of data encapsulated within the frame body 316. The MAC header 314 includes a duration field indicating a duration extending from the end of the PPDU until at least the end of an acknowledgment (ACK) or Block ACK (BA) of the PPDU that is to be transmitted by the receiving wireless communication device. The use of the duration field serves to reserve the wireless medium for the indicated duration, and enables the receiving device to establish its network allocation vector (NAV). The MAC header 314 also includes one or more fields indicating addresses for the data encapsulated within the frame body 316. For example, the MAC header 314 may include a combination of a source address, a transmitter address, a receiver address or a destination address. The MAC header 314 may further include a frame control field containing control information. The frame control field may specify a frame type, for example, a data frame, a control frame, or a management frame.

Figure 4:
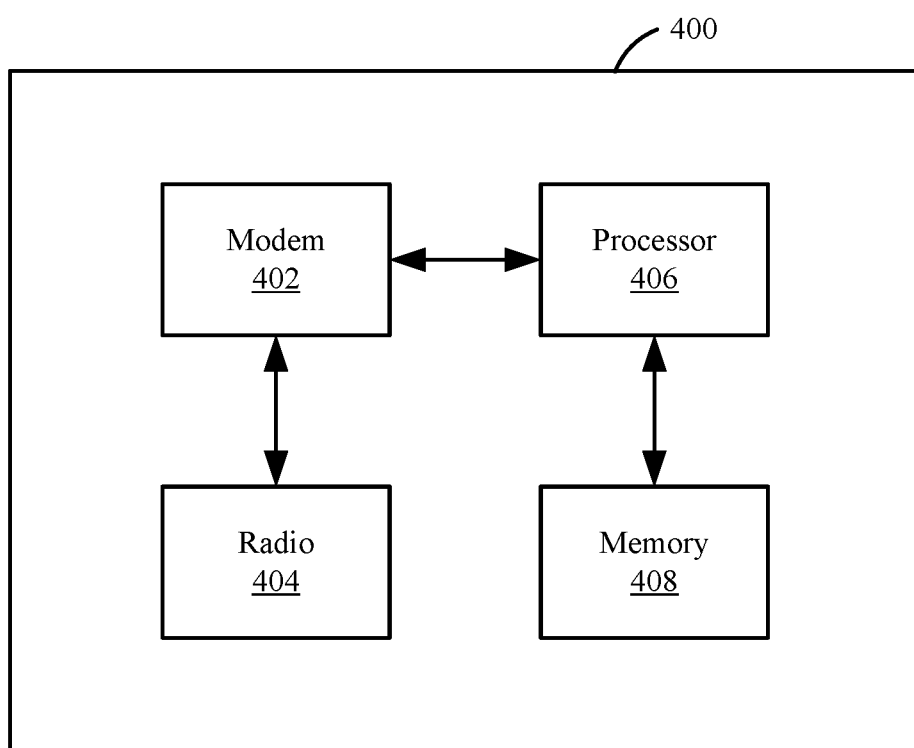
FIG. 4 shows a block diagram of an example wireless communication device.

FIG. 4 shows a block diagram of an example wireless communication device 400. In some implementations, the wireless communication device 400 can be an example of a device for use in a STA such as one of the STAs 104 described with reference to FIG. 1. In some implementations, the wireless communication device 400 can be an example of a device for use in an AP such as the AP 102 described with reference to FIG. 1. The wireless communication device 400 is capable of transmitting (or outputting for transmission) and receiving wireless communications (for example, in the form of wireless packets). For example, the wireless communication device can be configured to transmit and receive packets in the form of physical layer convergence protocol (PLCP) protocol data units (PPDUs) and medium access control (MAC) protocol data units (MPDUs) conforming to an IEEE 802.11 wireless communication protocol standard, such as that defined by the IEEE 802.11-2016 specification or amendments thereof including, but not limited to, 802.11ah, 802.11ad, 802.11ay, 802.11ax, 802.11az, 802.11ba and 802.11be.

The wireless communication device 400 can be, or can include, a chip, system on chip (SoC), chipset, package or device that includes one or more modems 402, for example, a Wi-Fi (IEEE 802.11 compliant) modem. In some implementations, the one or more modems 402 (collectively "the modem 402") additionally include a WWAN modem (for example, a 3GPP 4G LTE or 5G compliant modem). In some implementations, the wireless communication device 400 also includes one or more radios 404 (collectively "the radio 404"). In some implementations, the wireless communication device 406 further includes one or more processors, processing blocks or processing elements 406 (collectively "the processor 406") and one or more memory blocks or elements 408 (collectively "the memory 408").

The modem 402 can include an intelligent hardware block or device such as, for example, an application-specific integrated circuit (ASIC) among other possibilities. The modem 402 is generally configured to implement a PHY layer. For example, the modem 402 is configured to modulate packets and to output the modulated packets to the radio 404 for transmission over the wireless medium. The modem 402 is similarly configured to obtain modulated packets received by the radio 404 and to demodulate the packets to provide demodulated packets. In addition to a modulator and a demodulator, the modem 402 may further include digital signal processing (DSP) circuitry, automatic gain control (AGC), a coder, a decoder, a multiplexer and a demultiplexer. For example, while in a transmission mode, data obtained from the processor 406 is provided to a coder, which encodes the data to provide encoded bits. The encoded bits are then mapped to points in a modulation constellation (using a selected MCS) to provide modulated symbols. The modulated symbols may then be mapped to a number Nss of spatial streams or a number NsTs of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and ultimately, the radio 404. In implementations involving beamforming, the modulated symbols in the respective spatial streams are precoded via a steering matrix prior to their provision to the IFFT block.

While in a reception mode, digital signals received from the radio 404 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The demultiplexed bits may then be descrambled and provided to the MAC layer (the processor 406) for processing, evaluation or interpretation.

The radio 404 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may, in turn, be coupled to one or more antennas. For example, in some implementations, the wireless communication device 400 can include, or be coupled with, multiple transmit antennas (each with a corresponding transmit chain) and multiple receive antennas (each with a corresponding receive chain). The symbols output from the modem 402 are provided to the radio 404, which then transmits the symbols via the coupled antennas. Similarly, symbols received via the antennas are obtained by the radio 404, which then provides the symbols to the modem 402.

The processor 406 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 406 processes information received through the radio 404 and the modem 402, and processes information to be output through the modem 402 and the radio 404 for transmission through the wireless medium. For example, the processor 406 may implement a control plane and MAC layer configured to perform various operations related to the generation and transmission of MPDUs, frames or packets. The MAC layer is configured to perform or facilitate the coding and decoding of frames, spatial multiplexing, space-time block coding (STBC), beamforming, and OFDMA resource allocation, among other operations or techniques. In some implementations, the processor 406 may generally control the modem 402 to cause the modem to perform various operations described above.

The memory 404 can include tangible storage media such as random-access memory (RAM) or read-only memory (ROM), or combinations thereof. The memory 404 also can store non-transitory processor- or computer-executable software (SW) code containing instructions that, when executed by the processor 406, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 5B:
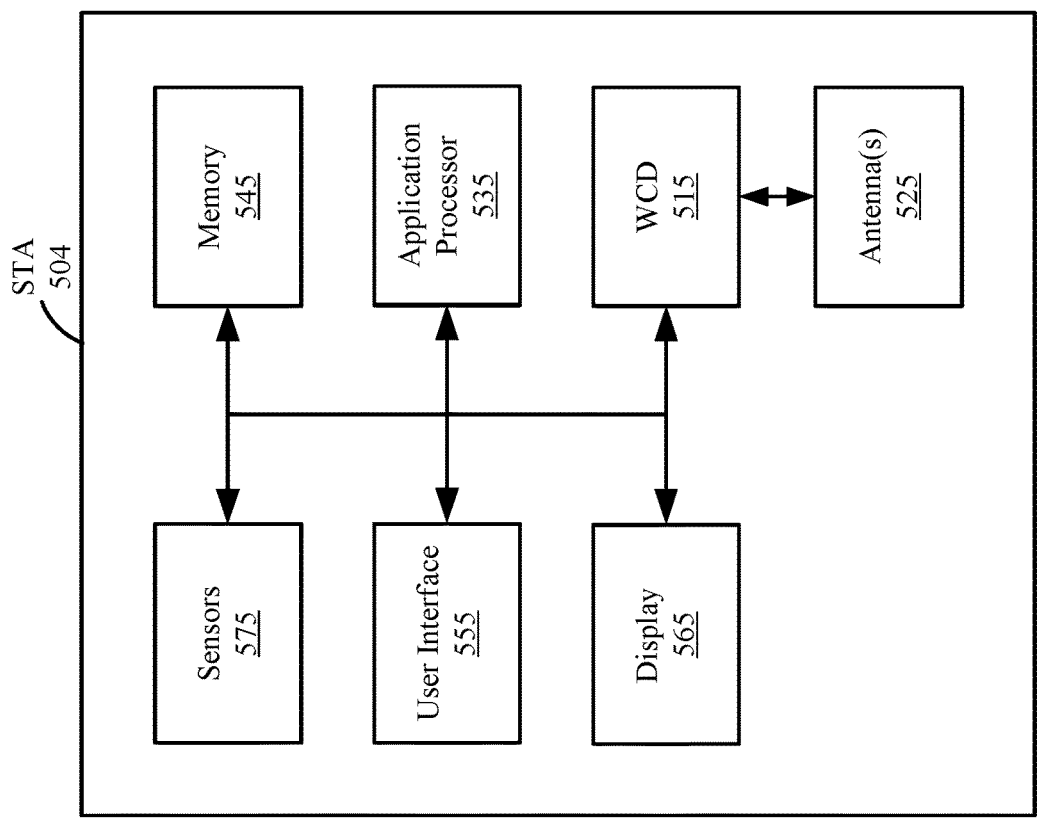
FIG. 5B shows a block diagram of an example STA.
Figure 5A:
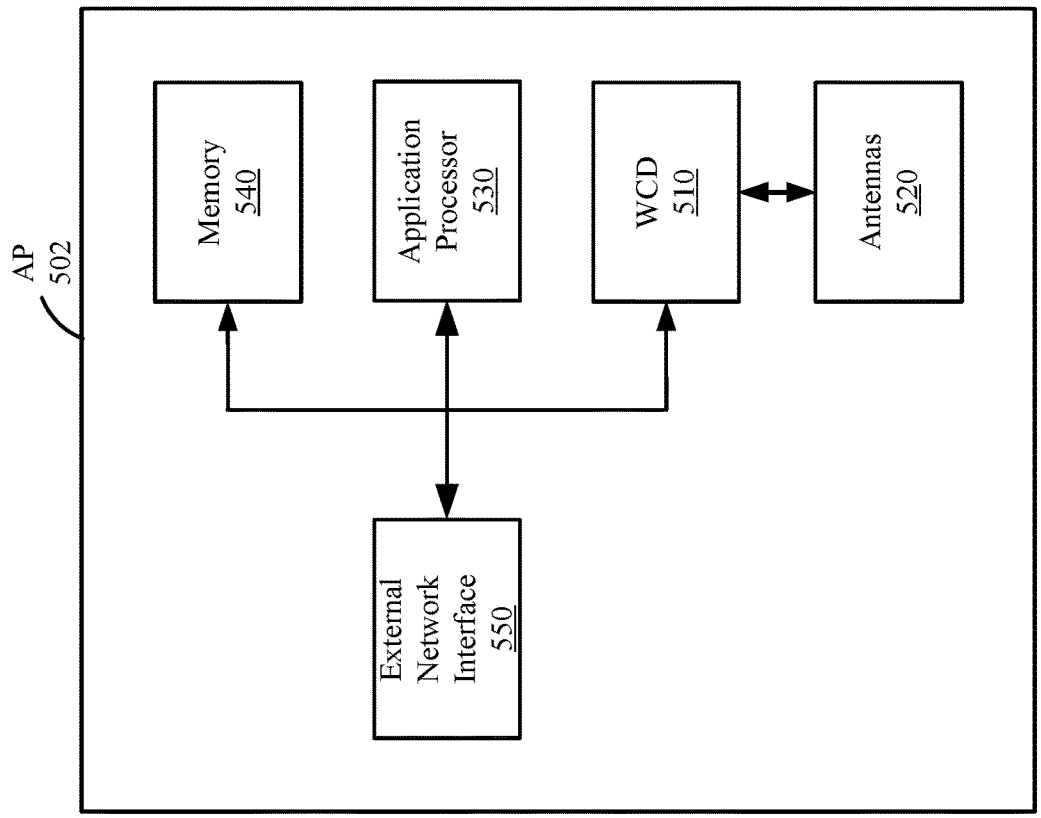
FIG. 5A shows a block diagram of an example AP.

FIG. 5A shows a block diagram of an example AP 502. For example, the AP 502 can be an example implementation of the AP 102 described with reference to FIG. 1. The AP 502 includes a wireless communication device (WCD) 510 (although the AP 502 may itself also be referred to generally as a wireless communication device as used herein). For example, the wireless communication device 510 may be an example implementation of the wireless communication device 400 described with reference to FIG. 4. The AP 502 also includes multiple antennas 520 coupled with the wireless communication device 510 to transmit and receive wireless communications. In some implementations, the AP 502 additionally includes an application processor 530 coupled with the wireless communication device 510, and a memory 540 coupled with the application processor 530. The AP 502 further includes at least one external network interface 550 that enables the AP 502 to communicate with a core network or backhaul network to gain access to external networks including the Internet. For example, the external network interface 550 may include one or both of a wired (for example, Ethernet) network interface and a wireless network interface (such as a WWAN interface).

Ones of the aforementioned components can communicate with other ones of the components directly or indirectly, over at least one bus. The AP 502 further includes a housing that encompasses the wireless communication device 510, the application processor 530, the memory 540, and at least portions of the antennas 520 and external network interface 550.

FIG. 5B shows a block diagram of an example STA 504. For example, the STA 504 can be an example implementation of the STA 104 described with reference to FIG. 1. The STA 504 includes a wireless communication device 515 (although the STA 504 may itself also be referred to generally as a wireless communication device as used herein). For example, the wireless communication device 515 may be an example implementation of the wireless communication device 400 described with reference to FIG. 4. The STA 504 also includes one or more antennas 525 coupled with the wireless communication device 515 to transmit and receive wireless communications. The STA 504 additionally includes an application processor 535 coupled with the wireless communication device 515, and a memory 545 coupled with the application processor 535. In some implementations, the STA 504 further includes a user interface (UI) 555 (such as a touchscreen or keypad) and a display 565, which may be integrated with the UI 555 to form a touchscreen display. In some implementations, the STA 504 may further include one or more sensors 575 such as, for example, one or more inertial sensors, accelerometers, temperature sensors, pressure sensors, or altitude sensors. Ones of the aforementioned components can communicate with other ones of the components directly or indirectly, over at least one bus. The STA 504 further includes a housing that encompasses the wireless communication device 515, the application processor 535, the memory 545, and at least portions of the antennas 525, UI 555, and display 565.

As described above, existing versions of the IEEE 802.11 standard define a trigger frame format which can be used to solicit the transmission of a TB PPDU from one or more STAs. The trigger frame allocates resources to one or more STAs for the transmission of the TB PPDU and indicates how the TB PPDU is to be configured for transmission. For example, the trigger frame may indicate an RU that is allocated for transmission in the TB PDDU. The RU represents a series of tones or subcarriers spanning a wireless channel on which the TB PPDU is to be transmitted. However, the TB PPDU cannot be transmitted, in accordance with existing versions of the IEEE 802.11 standard, if any portion of the wireless channel is busy or otherwise unavailable. As new WLAN communication protocols enable enhanced WLAN communication features (such as increased bandwidth and support for larger RUs and MRUs), new trigger frame and PPDU formats are needed to provide greater flexibility in medium utilization.

Various aspects relate generally to trigger-based communications that support new wireless communication protocols, and more particularly, to trigger frame and PPDU designs that support RU downsizing. As used herein, the term "RU downsizing" refers to the transmission of a TB PPDU spanning an RU or an MRU that is smaller than the RU or MRU originally allocated in the TB PPDU. For example, an AP may transmit a trigger frame soliciting a TB PPDU from a STA. In some aspects, the trigger frame may carry RU allocation information indicating the allocated RU or MRU (associated with a wireless medium) and downsizing information indicating whether downsizing of the RU or MRU is permitted. If interference is detected in a portion of the wireless medium (such as due to the medium being busy), and downsizing is permitted, the STA may transmit the TB PPDU on tones (or subcarriers) spanning a downsized RU or MRU. The downsized RU or MRU includes a subset of the tones in the RU or MRU allocated by the trigger frame. In some aspects, the downsized RU or MRU may be required to include one or more guaranteed tones. The guaranteed tones span a portion of the wireless medium on which the AP expects to receive signaling for the TB PPDU such as, for example, in a PHY preamble. Thus, in some aspects, the STA may provide signaling for the downsized RU or MRU in the PHY preamble of the TB PPDU.

Particular implementations of the subject matter described in this disclosure can be implemented to realize one or more of the following potential advantages. RU downsizing provides greater flexibility in medium utilization for trigger-based communications. By allowing a STA to transmit a TB PPDU on a subset of the tones allocated by a trigger frame, aspects of the present disclosure may support increases in network throughput achievable in accordance with the IEEE 802.11be amendment, and future generations, of the IEEE 802.11 standard. For example, if only a portion of the wireless medium is busy or unavailable, the STA may transmit the TB PPDU on tones spanning a downsized RU or MRU that avoids the busy portion. As a result, the TB PPDU may adapt to the conditions of the wireless medium. By requiring the downsized RU or MRU to include one or more guaranteed tones, aspects of the present disclosure may ensure that an AP is able to detect the TB PPDU and recover the information carried therein. For example, the PHY preamble of the TB PPDU can be decoded in its entirety from the guaranteed tones. Thus, by signaling the downsized RU or MRU in the PHY preamble, aspects of the present disclosure may ensure that the AP can identify the downsized RU or MRU in the TB PPDU by observing only the guaranteed tones.

Figure 6:
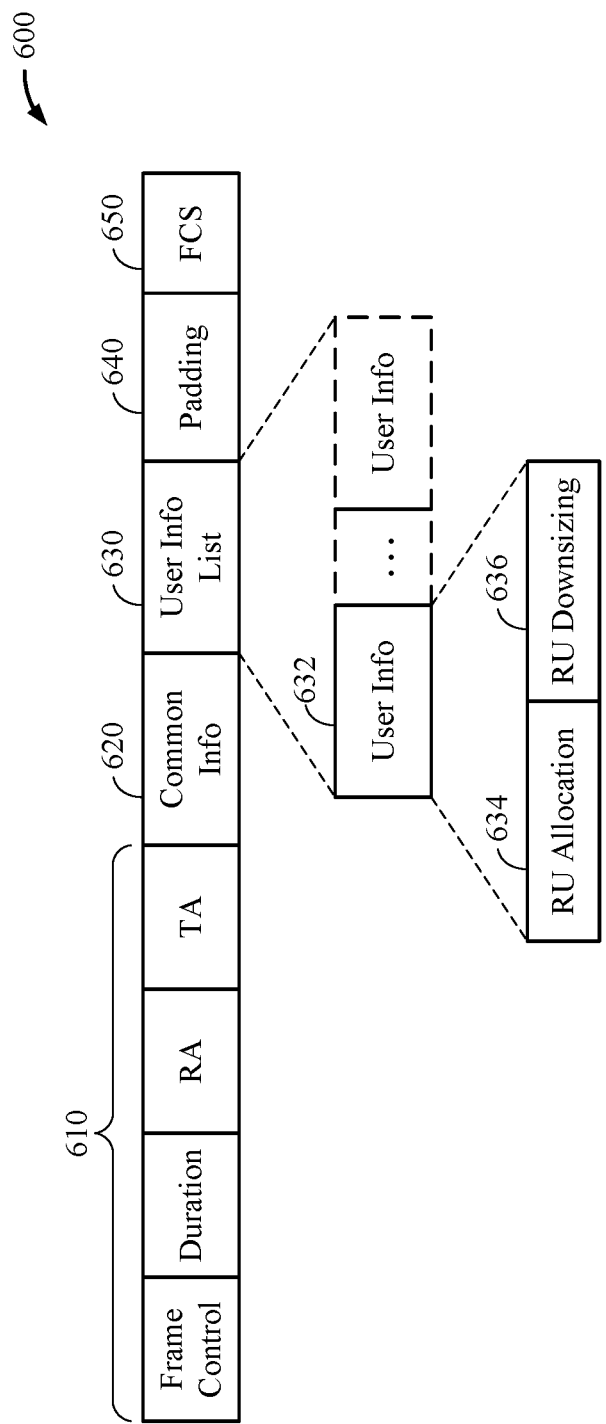
FIG. 6 shows an example trigger frame usable for communications between an AP and a number of STAs according to some implementations.

FIG. 6 shows an example trigger frame 600 usable for communications between an AP and a number of STAs according to some implementations. The trigger frame 600 may be used to solicit a TB PPDU from one or more STAs. With reference for example to FIG. 1, the AP 102 may transmit the trigger frame 600 to one or more of the STAs 104 to solicit a TB PPDU from the STAs. The trigger frame 600 may allocate an RU or MRU for transmission in the TB PPDU. In some implementations, the trigger frame 600 may allow RU downsizing for one or more of the RUs or MRUs within the TB PPDU.

The trigger frame 600 includes a MAC header 610, a common information field 620, a user information list 630, zero or more padding bits 640, and an FCS 650. The MAC header 610 includes a frame control field, a duration field, a receiver address (RA) field, and a transmitter address (TA) field. The common information field 620 and user information list 630 carry configuration information which may be used by a receiving device to configure a TB PPDU to be transmitted in response to receiving the trigger frame 600. In some aspects, the user information list 630 may include one or more user information fields 632 each carrying per-user information for a respective user. In contrast, the common information field 620 may carry information that is common to all recipients of the trigger frame 600 (such as any users identified in the user information list 630).

In some implementations, each user information field 632 may carry RU allocation information 634 and RU downsizing information 636. The RU allocation information 634 indicates an RU or MRU that is allocated for transmission in the TB PPDU and the RU downsizing information 636 indicates whether RU downsizing is permitted for the respective RU or MRU. In other words, the RU downsizing information 636 may indicate whether the TB PPDU can be transmitted on one or more tones spanning a downsized RU or MRU that is smaller than the RU or MRU indicated by the RU allocation information 634. Because the trigger frame 600 may include multiple user information fields 632 (to solicit a TB PPDU from multiple users), the RU downsizing information 636 may apply only to the RU allocation information 634 in the same user information field 632. In some aspects, the RU downsizing information 636 may be indicated by a value of a downsizing bit in the user information field 632. In some other aspects, the RU allocation information 634 and the RU downsizing information 636 may be collectively indicated by a value of an RU allocation subfield of the user information field.

Aspects of the present disclosure recognize that the trigger frame 600 may include a number of reserved bits. Reserved bits represent unused bits that are reserved for future implementations of the IEEE 802.11 standard. In some aspects, one or more reserved bits in an earlier version or release of the IEEE 802.11 standard may be repurposed (to carry information) in a later version or release. For example, some reserved bits in the trigger frame 600 may be repurposed, in later versions or releases of the IEEE 802.11 standard, to expand a range of values that can be represented by existing fields in an earlier version or release. Some other reserved bits in the trigger frame 600 may be repurposed, in later versions or releases of the IEEE 802.11 standard, to convey information that is unrelated to any information conveyed in the earlier version or release (or remains unused in the later version or release). In some implementations, one or more of the reserved bits in the trigger frame 600 may be repurposed to carry the RU allocation information 634.

Figure 7:
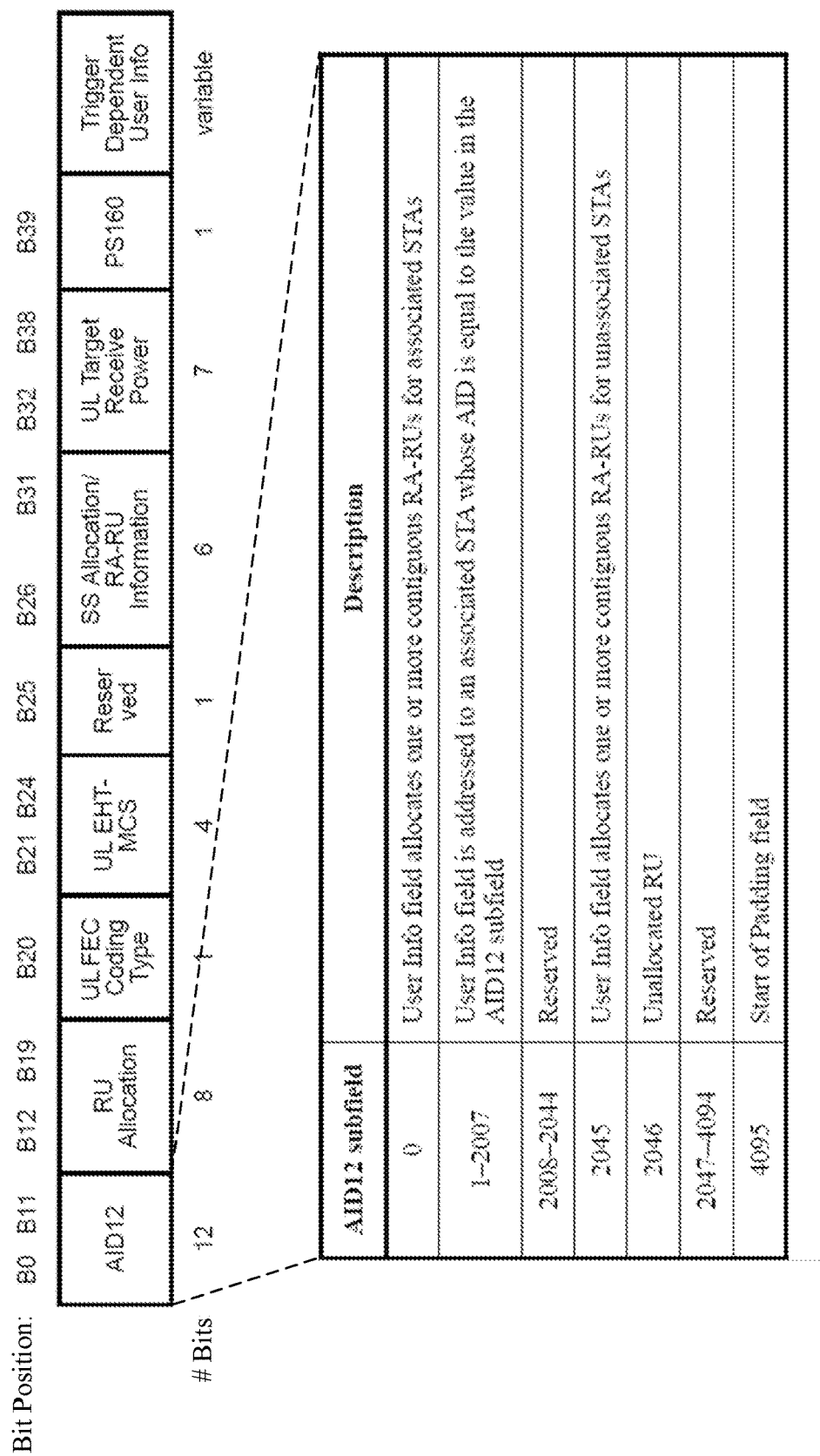
FIG. 7 shows an example user information field for a trigger frame formatted in accordance with an existing trigger frame format.

FIG. 7 shows an example user information field 700 for a trigger frame formatted in accordance with an existing trigger frame format. More specifically, the user information field 700 conforms to the Extremely High Throughput (EHT) variant user information field format defined by an initial release of the IEEE 802.11be amendment of the IEEE 802.11 standard. With reference for example to FIG. 6, the user information field 700 may be one example of the user information field 632. Each user information field in a user information list is identified by a respective association identifier (AID) value in the AID12 subfield (in bit positions B0-B11). In some aspects, the AID value may uniquely identify a particular STA (or user) in a BSS. As shown in FIG. 7, the user information field 700 includes a reserved bit (in bit position B25). In some implementations, the reserved bit may be repurposed to carry the RU downsizing information 636. For example, the reserved bit may be replaced by a downsizing bit (or subfield) in future releases or versions of the IEEE 802.11 standard. Accordingly, a first value of the downsizing bit (such as "1") may indicate that RU downsizing is permitted while a second value of the downsizing bit (such as "0") may indicate that RU downsizing is not permitted.

The user information field 700 also includes an RU allocation subfield (in bit positions B12-B19) and a PS160 subfield (in bit position B39). A combined value of the RU allocation subfield and the PS160 subfield maps to an entry in an RU allocation table. The RU allocation table is a lookup table (LUT) that stores a number of entries representing respective RU or MRU allocations. Specifically, each entry in the RU allocation table may indicate a bandwidth, an RU/MRU size, and an RU/MRU index. In some implementations, each entry in the RU allocation table may be configured to convey RU allocation information 634 in addition to RU downsizing information 636. For example, aspects of the present disclosure recognize that the RU allocation table associated with existing versions of the IEEE 802.11 standard includes several reserved entries that can be repurposed to indicate RU/MRU allocations for which downsizing is permitted (referred to herein as "downsize entries"). Table 1 shows an example RU allocation table suitable for conveying RU downsizing information 636 (for simplicity, only two entries are shown in Table 1).

TABLE 1

| PS160 Subfield | B0 of the RU Allocation Subfield | B7-B1 of the RU Allocation Subfield | Bandwidth (MHz) | RU/MRU Size | RU/MRU Index | PHY RU/MRU Index |
|---|---|---|---|---|---|---|
| 0 | 0 | 104 | 320 | 3 × 996 | MRU1 | MRU Index |
| Any | Any | 107 | 320 | 3 × 996 | MRU1 | MRU Index |

As shown in Table 1, both entries of the RU allocation table identify the same MRU. However, the first entry of Table 1 (where bits B7-B1 have a value equal to 104) represents an existing entry of an RU allocation table whereas the second entry of Table 1 (where bits B7-B1 have a value equal to 107) represents a downsize entry of the RU allocation table. In other words, the first entry can be found in an RU allocation table defined by existing versions of the IEEE 802.11 standard. In contrast, the second entry is reserved in the existing RU allocation table. When the value of the RU allocation subfield (and PS160 subfield) maps to an RU or MRU associated with an existing entry in the RU allocation table (such as the first entry of Table 1), RU downsizing is not permitted for that RU or MRU. On the other hand, when the value of the RU allocation subfield (and PS160 subfield) maps to an RU or MRU associated with a downsize entry in the RU allocation table (such as the second entry of Table 1), RU downsizing is permitted for that RU or MRU.

Figure 8:
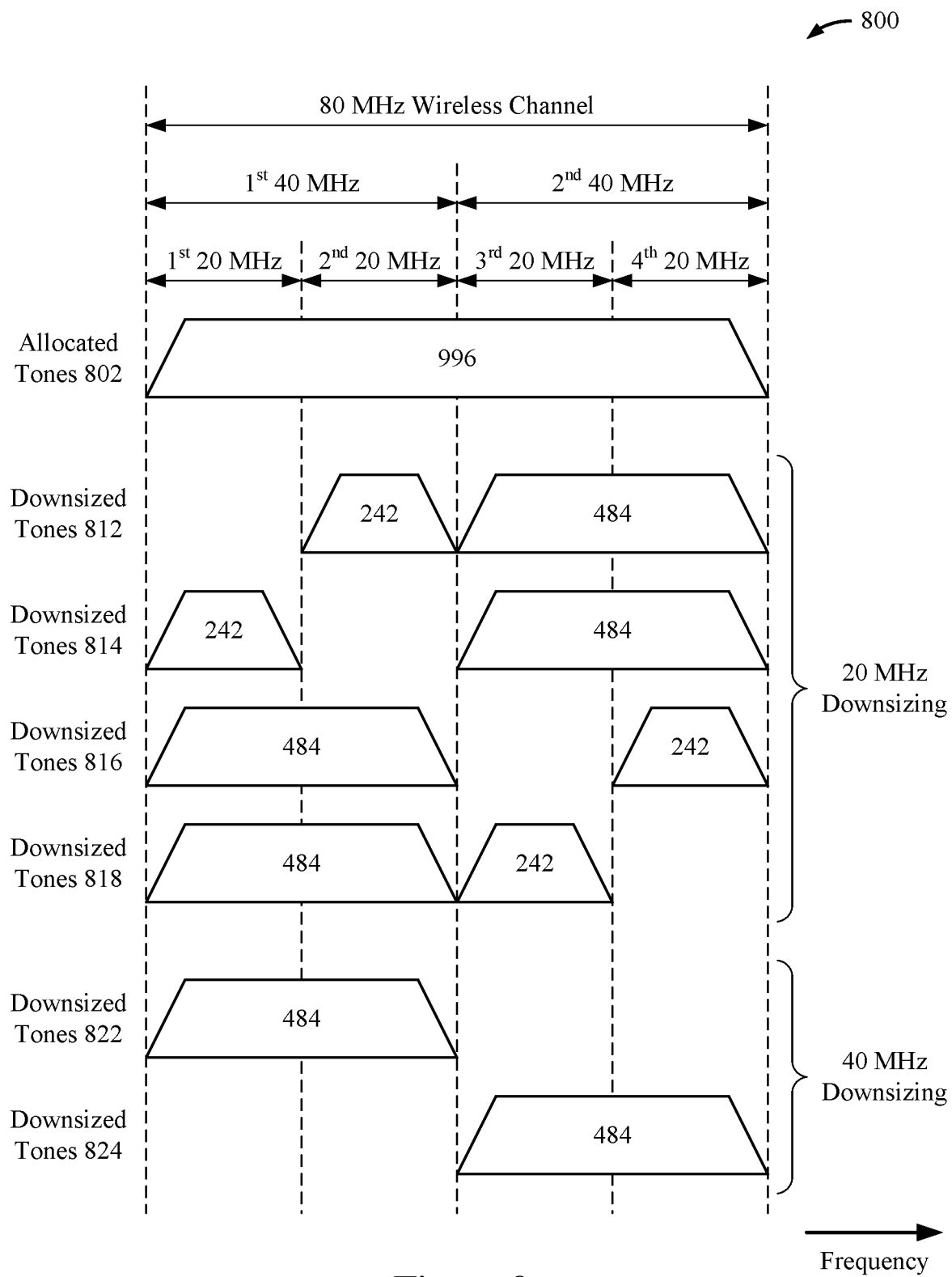
FIG. 8 shows a frequency diagram depicting example resource allocations for a wireless channel according to some implementations.

FIG. 8 shows a frequency diagram 800 depicting example resource allocations for a wireless channel according to some implementations. More specifically, FIG. 8 shows a set of tones 802 that can be allocated in a TB PPDU and various tone configurations 812-824 that can be used for RU downsizing. For example, an AP may transmit a trigger frame (such as the trigger frame 600 of FIG. 6) soliciting a TB PPDU to be transmitted by a STA on the set of allocated tones 802. In the example of FIG. 8, the allocated tones 802 represent a 996-tone RU spanning an 80 MHz wireless channel. In some implementations, the trigger frame may carry RU downsizing information indicating that downsizing is permitted for the allocated tones 802. For example, in some instances, the STA may detect interference on a portion of the 80 MHz channel due to the medium being busy (such as being used by other STAs). In such instances, the STA may transmit the TB PPDU using one of the downsized tone configurations 812-824 that avoids the busy portion of the channel.

Each of the downsized tone configurations 812-816 spans three 20 MHz subchannels of the 80 MHz wireless channel. For example, the downsized tone configuration 812 represents a 484+242-tone MRU spanning the $2^{nd}$, $3^{rd}$, and $4^{th}$ 20 MHz subchannels; the downsized tone configuration 814 represents a 484+242-tone MRU spanning the $1^{st}$, $3^{rd}$, and $4^{th}$ 20 MHz subchannels; the downsized tone configuration 816 represents a 484+242-tone MRU spanning the $1^{st}$, $2^{nd}$, and $4^{th}$ 20 MHz subchannels; and the downsized tone configuration 818 represents a 484+242-tone MRU spanning the $1^{st}$, $2^{nd}$, and $3^{rd}$ 20 MHz subchannels. Each of the downsized tone configurations 822 and 824 spans a respective 40 MHz subchannel of the 80 MHz channel. For example, the downsized tone configuration 822 represents a 484-tone RU spanning the $1^{st}$ 40 MHz subchannel and the downsized tone configuration 824 represents a 484-tone RU spanning the $2^{nd}$ 40 MHz subchannel.

In some implementations, the downsized tone configurations 812-824 provide greater flexibility in medium utilization. For example, if the STA detects interference on one or more tones in the $1^{st}$ 20 MHz of the 80 MHz channel, the STA may transmit the TB PPDU using the downsized tone configuration 812 or 824. Similarly, if the STA detects interference on one or more tones in the $2^{nd}$ 20 MHz subchannel of the 80 MHz channel, the STA may transmit the TB PPDU using the downsized tone configuration 814 or 824. Further, if the STA detects interference on one or more tones in the $3^{rd}$ 20 MHz subchannel of the 80 MHz channel, the STA may transmit the TB PPDU using the downsized tone configuration 816 or 822. Still further, if the STA detects interference on one or more tones in the $4^{th}$ 20 MHz subchannel of the 80 MHz channel, the STA may transmit the TB PPDU using the downsized tone configuration 818 or 822.

Aspects of the present disclosure recognize that it is difficult for the AP to recover the TB PPDU without knowledge of the tones on which the TB PPDU is transmitted. Thus, when the STA performs RU downsizing, the AP needs to know which of the downsized tone configurations 812-824 is used to transmit the TB PPDU. In some implementations, the downsized tone configuration may be required to include a subset of "guaranteed" tones of the allocated tones 802. The guaranteed tones may span a subchannel on which the AP expects (or is guaranteed) to receive signaling for the downsized tone configuration. Signaling refers to control fields or information that can be used by a wireless communication device to interpret another field or portion of a PPDU. Aspects of the present disclosure recognize that the PHY preamble of a TB PPDU carries signaling for the TB PPDU and is duplicated on each 20 MHz subchannel of the wireless channel associated with the TB PPDU. Thus, in some aspects, the guaranteed tones may span at least a 20 MHz subchannel of the wireless channel associated with the allocated tones 802.

Figure 9:
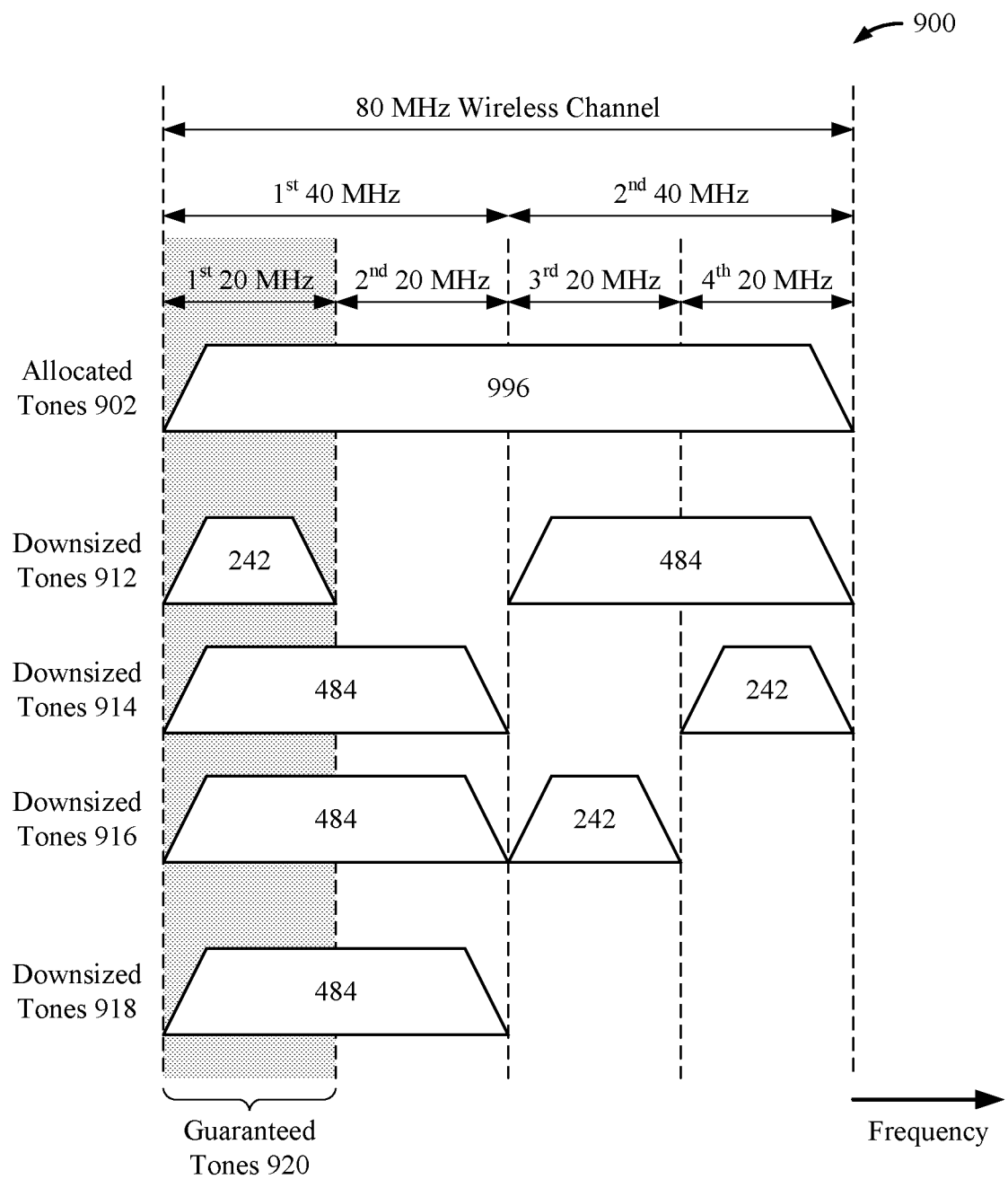
FIG. 9 shows a frequency diagram depicting example resource allocations of a wireless channel that include a guaranteed subchannel, according to some implementations.

FIG. 9 shows a frequency diagram 900 depicting example resource allocations for a wireless channel that include a guaranteed subchannel, according to some implementations. More specifically, FIG. 9 shows a set of tones 902 that can be allocated in a TB PPDU and various tone configurations 912-918 that can be used for RU downsizing. For example, an AP may transmit a trigger frame (such as the trigger frame 600 of FIG. 6) soliciting a TB PPDU to be transmitted by a STA on the set of allocated tones 902. In the example of FIG. 9, the allocated tones 902 represent a 996-tone RU spanning an 80 MHz wireless channel. In some implementations, the trigger frame may carry RU downsizing information indicating that downsizing is permitted for the allocated tones 902. Accordingly, if the STA detects interference on a portion of the 80 MHz channel, the STA may transmit the TB PPDU using one of the downsized tone configurations 912-918 that avoids the busy portion of the channel.

In some implementations, the $1^{st}$ 20 MHz subchannel of the 80 MHz channel is associated with a set of guaranteed tones 920. As such, each of the downsized tone configurations 912-918 is required to include at least the $1^{st}$ 20 MHz subchannel. For example, the downsized tone configuration 912 represents a 484+242-tone MRU spanning the $1^{st}$, $3^{rd}$, and $4^{th}$ 20 MHz subchannels; the downsized tone configuration 914 represents a 484+242-tone MRU spanning the $1^{st}$, $2^{nd}$, and $4^{th}$ 20 MHz subchannels; the downsized tone configuration 916 represents a 484+242-tone MRU spanning the $1^{st}$, $2^{nd}$, and $3^{rd}$ 20 MHz subchannels; and the downsized tone configuration 918 represents a 484-tone RU spanning the $1^{st}$ 40 MHz subchannel. With reference for example to FIG. 8, the $1^{st}$ 20 MHz subchannel is punctured in each of the downsized tone configurations 812 and 824. Thus, the downsized tone configurations 812 and 824 are incompatible with the guaranteed tones 920 and cannot be used for downsizing the allocated tones 902.

In the example of FIG. 9, the guaranteed tones 920 are shown to include the $1^{st}$ 20 MHz subchannel of the 80 MHz channel. However, in some other implementations, the guaranteed tones may include any of the $2^{nd}$, $3^{rd}$ or $4^{th}$ 20 MHz subchannels of the 80 MHz channel. Still further, in some implementations, the guaranteed tones may span a subchannel larger than 20 MHz (such as a 40 MHz subchannel) for wireless channels associated with larger RUs or MRUs (such as a 2×996-tone RU). In some implementations, the guaranteed tones 920 may be static or known to the STA without any additional signaling from the AP. For example, in some aspects, the location of the guaranteed tones 920 may coincide with the location of a primary 20 MHz subchannel within a given wireless channel. In some other implementations, the guaranteed tones 920 may be dynamically allocated by the AP. For example, the AP may signal the location of the guaranteed tones 920 to the STA. Such signaling is referred to herein as "RU guarantee information."

In some implementations, the RU guarantee information may include a bitmap. Specifically, each bit of the bitmap may represent a respective subchannel of a given wireless channel. In some aspects, the bitmap may include 16 bits representing a 320 MHz channel. Thus, each bit of the bitmap may be associated with a respective 20 MHz subchannel of the 320 MHz channel. For example, any bit of the bitmap having a value equal to "1" may indicate that the guaranteed tones include the 20 MHz subchannel associated with that bit. In some other aspects, the bitmap may include 8 bits representing a 320 MHz channel. Thus, each bit of the bitmap may be associated with a respective 40 MHz subchannel of the 320 MHz channel. For example, any bit of the bitmap having a value equal to "1" may indicate that the guaranteed tones include the 40 MHz subchannel associated with that bit. Aspects of the present disclosure recognize that a bitmap provides a high degree of flexibility in allocating guaranteed tones but may also require a significant amount of signaling overhead.

In some other implementations, the RU guarantee information may signal a respective location of the guaranteed tones within each subchannel of a given wireless channel. In some aspects, the signaling may include 4 pairs of bits representing a 320 MHz channel, where each pair of bits is associated with a respective 80 MHz subchannel. The value of each pair of bits may indicate which 20 MHz subchannel of the 80 MHz channel is associated with the guaranteed tones. For example, a pair of bits having a value of "00," "01," "10," or "11" may indicate that the guaranteed tones include the $1^{st}$, $2^{nd}$, $3^{rd}$, or $4^{th}$ 20 MHz subchannel, respectively, of the 80 MHz channel. In some other aspects, the signaling may include 2 pairs of bits representing a 320 MHz channel, where each pair of bits is associated with a respective 160 MHz subchannel. The value of each pair of bits may indicate which 40 MHz subchannel of the 160 MHz channel is associated with the guaranteed tones. For example, a pair of bits having a value of "00," "01," "10," or "11" may indicate that the guaranteed tones include the $1^{st}$, $2^{nd}$, $3^{rd}$, or $4^{th}$ 40 MHz subchannel, respectively, of the 160 MHz channel. Aspects of the present disclosure recognize that requiring a set of guaranteed tones to be present in each subchannel of a wireless channel reduces signaling overhead but also limits the flexibility with which the guaranteed tones can be allocated.

In some other implementations, the RU guarantee information may signal at most one set of guaranteed tones within each subchannel of a given wireless channel. Such signaling may require at least 5 different values to be represented for each subchannel. For example, at least one of the values may be used to indicate that a given subchannel includes no guaranteed tones and the 4 remaining values may be used to indicate the location of the guaranteed tones within the subchannel. In some aspects, each 5-value set may be associated with a respective 80 MHz subchannel of a 320 MHz channel. For example, an integer value of 0 may indicate the 80 MHz subchannel does not include any guaranteed tones, whereas integer values of 1, 2, 3, and 4 may indicate that the guaranteed tones include the $1^{st}$, $2^{nd}$, $3^{rd}$, or $4^{th}$ 20 MHz subchannel, respectively, of the 80 MHz channel. In some implementations, 3 bits may be allocated for each 80 MHz channel to signal a binary representation of the values 0, 1, 2, 3, and 4 (such as "000," "001," "010," "011," and "100," respectively). However, aspects of the present disclosure recognize that such signaling requires significant overhead and results in several unused values or bit combinations.

In some other implementations, the values associated with a first 80 MHz channel may be combined with the values associated with a second 80 MHz channel and mapped to a respective entry in a lookup table (LUT). In such implementations, the signaling may include bits per 160 MHz bandwidth, where each 5-bit value maps to one of 25 entries in the LUT. Table 2 shows an example LUT suitable for signaling the location of at most one guaranteed tone within each 80 MHz subchannel of a 160 MHz channel.

TABLE 2

| Value (5 bits) | 160 MHz | |
|---|---|---|
| | Guaranteed Tones in $1^{st}$ 80 MHz | Guaranteed Tones in $2^{nd}$ 80 MHz |
| 0 | None | None |
| 1 | | $1^{st}$ 20 MHz |
| 2 | | $2^{nd}$ 20 MHz |
| 3 | | $3^{rd}$ 20 MHz |
| 4 | | $4^{th}$ 20 MHz |
| 5 | $1^{st}$ 20 MHz | None |
| 6 | | $1^{st}$ 20 MHz |
| 7 | | $2^{nd}$ 20 MHz |
| 8 | | $3^{rd}$ 20 MHz |
| 9 | | $4^{th}$ 20 MHz |
| 10 | $2^{nd}$ 20 MHz | None |
| 11 | | $1^{st}$ 20 MHz |
| 12 | | $2^{nd}$ 20 MHz |
| 13 | | $3^{rd}$ 20 MHz |
| 14 | | $4^{th}$ 20 MHz |
| 15 | $3^{rd}$ 20 MHz | None |
| 16 | | $1^{st}$ 20 MHz |
| 17 | | $2^{nd}$ 20 MHz |
| 18 | | $3^{rd}$ 20 MHz |
| 19 | | $4^{th}$ 20 MHz |
| 20 | $4^{th}$ 20 MHz | None |
| 21 | | $1^{st}$ 20 MHz |
| 22 | | $2^{nd}$ 20 MHz |
| 23 | | $3^{rd}$ 20 MHz |
| 24 | | $4^{th}$ 20 MHz |

TABLE 2-continued

| Value (5 bits) | 160 MHz | |
|---|---|---|
| | Guaranteed Tones in $1^{st}$ 80 MHz | Guaranteed Tones in $2^{nd}$ 80 MHz |
| 25 | | Reserved |
| 26 | | Reserved |
| 27 | | Reserved |
| 28 | | Reserved |
| 29 | | Reserved |
| 30 | | Reserved |
| 31 | | Reserved |

As shown in Table 2, each 5-bit entry of the LUT indicates the location of the guaranteed tones (or that no guaranteed tones are present) in the $1^{st}$ 80 MHz subchannel of a 160 MHz channel as well as the location of the guaranteed tones (or that no guaranteed tones are present) in the $2^{nd}$ 80 MHz subchannel of the 160 MHz channel. An additional 5-bit LUT may be needed to indicate the locations of the guaranteed tones in a second 160 MHz channel. As such, only 10 bits are needed to signal the locations of the guaranteed tones in a 320 MHz channel. In some aspects, the signaling overhead can be further reduced by changing the granularity of the guaranteed tones (such as from 20 MHz to 40 MHz). For example, Table 3 shows a LUT suitable for signaling the location of at most one guaranteed tone within each 160 MHz subchannel of a 320 MHz channel.

TABLE 3

| Value (5 bits) | 320 MHz | |
|---|---|---|
| | Guaranteed Tones in $1^{st}$ 160 MHz | Guaranteed Tones in $2^{nd}$ 160 MHz |
| 0 | None | None |
| 1 | | $1^{st}$ 40 MHz |
| 2 | | $2^{nd}$ 40 MHz |
| 3 | | $3^{rd}$ 40 MHz |
| 4 | | $4^{th}$ 40 MHz |
| 5 | $1^{st}$ 40 MHz | None |
| 6 | | $1^{st}$ 40 MHz |
| 7 | | $2^{nd}$ 40 MHz |
| 8 | | $3^{rd}$ 40 MHz |
| 9 | | $4^{th}$ 40 MHz |
| 10 | $2^{nd}$ 40 MHz | None |
| 11 | | $1^{st}$ 40 MHz |
| 12 | | $2^{nd}$ 40 MHz |
| 13 | | $3^{rd}$ 40 MHz |
| 14 | | $4^{th}$ 40 MHz |
| 15 | $3^{rd}$ 40 MHz | None |
| 16 | | $1^{st}$ 40 MHz |
| 17 | | $2^{nd}$ 40 MHz |
| 18 | | $3^{rd}$ 40 MHz |
| 19 | | $4^{th}$ 40 MHz |
| 20 | $4^{th}$ 40 MHz | None |
| 21 | | $1^{st}$ 40 MHz |
| 22 | | $2^{nd}$ 40 MHz |
| 23 | | $3^{rd}$ 40 MHz |
| 24 | | $4^{th}$ 40 MHz |
| 25 | | Reserved |
| 26 | | Reserved |
| 27 | | Reserved |
| 28 | | Reserved |
| 29 | | Reserved |
| 30 | | Reserved |
| 31 | | Reserved |

As shown in Table 3, each 5-bit entry of the LUT indicates the location of the guaranteed tones (or that no guaranteed tones are present) in the $1^{st}$ 160 MHz subchannel of a 320 MHz channel as well as the location of the guaranteed tones (or that no guaranteed tones are present) in the $2^{nd}$ 160 MHz subchannel of the 320 MHz channel. In this example, only 5 bits are needed to signal the locations of the guaranteed tones in a 320 MHz channel.

In some implementations, the RU guarantee information may be carried in a MAC management frame transmitted by the AP to one or more STAs. For example, the RU guarantee information can be carried in an information element (IE) of one or more beacon frames broadcast by the AP. In some aspects, the size of the IE can be large enough to accommodate any of the signaling implementations described above (including a 16-bit bitmap). However, because beacon frames are broadcast periodically, such implementations may not allow the AP to dynamically change the locations of the guaranteed tones to adapt to changes or variations in channel conditions. In some other implementations, the RU guarantee information may be carried in each trigger frame transmitted by the AP to one or more STAs. This allows the AP to dynamically allocate the guaranteed tones on a per-PPDU basis to accommodate the channel conditions at any given time.

Figure 10:
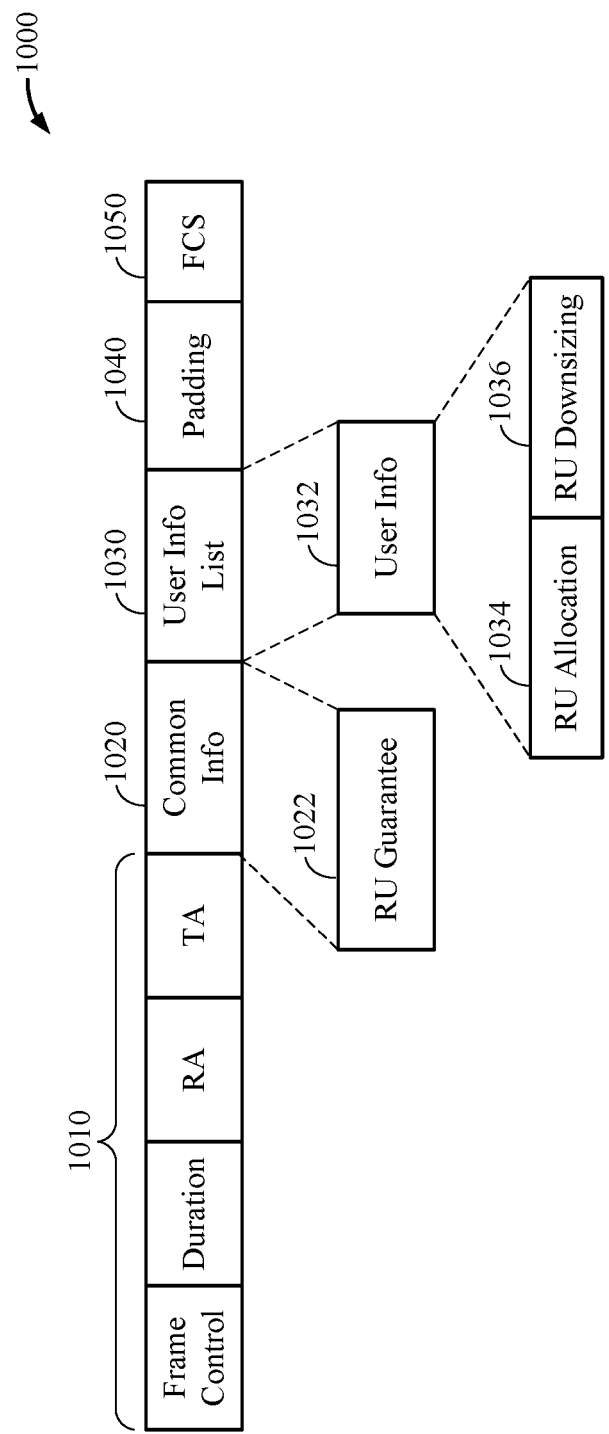
FIG. 10 shows another example trigger frame usable for communications between an AP and a number of STAs according to some implementations.

FIG. 10 shows another example trigger frame 1000 usable for communications between an AP and a number of STAs according to some implementations. In some implementations, the trigger frame 1000 may be one example of the trigger frame 600 of FIG. 6. For example, the trigger frame 1000 may be used to solicit a TB PPDU from one or more STAs. The trigger frame 1000 may allocate an RU or MRU to each STA for transmission within the TB PPDU. In some implementations, the trigger frame 1000 may allow RU downsizing for one or more RUs or MRUs within the TB PPDU.

The trigger frame 1000 includes a MAC header 1010, a common information field 1020, a user information list 1030, zero or more padding bits 1040, and an FCS 1050. The MAC header 1010 includes a frame control field, a duration field, an RA field, and a TA field. The common information field 1020 and user information list 1030 carry configuration information which may be used by a receiving device to configure a TB PPDU to be transmitted in response to receiving the trigger frame 1000. The user information list 1030 may include one or more user information fields 1032 each carrying per-user information for a respective user. In some implementations, each user information field 1032 may carry RU allocation information 1034 and RU downsizing information 1036. As described with reference to FIG. 6, the RU allocation information 1034 indicates an RU or MRU that is allocated for transmission in the TB PPDU and the RU downsizing information 1036 indicates whether RU downsizing is permitted for the respective RU or MRU.

The common information field 1020 may carry information that is common to all recipients of the trigger frame 1000 (such as any users identified in the user information list 1030). In some implementations, the common information field 1020 may carry RU guarantee information 1022 indicating one or more guaranteed tones to be included in the downsized RU or MRU. In some aspects, the RU guarantee information 1022 may include an 8-bit bitmap, where each bit of the bitmap represents a respective 40 MHz subchannel of a 320 MHz channel. In some other aspects, the RU guarantee information 1022 may signal a respective location of the guaranteed tones within each 80 MHz or 160 MHz subchannel of a 320 MHz channel. Still further, in some aspects, the RU guarantee information 1022 may signal at most one set of guaranteed tones within each 80 MHz or 160 MHz subchannel of a 320 MHz wireless channel. In some implementations, the RU guarantee information 1022 may replace one or more reserved bits in the common information field of a trigger frame format defined by existing versions of the IEEE 802.11 standard.

FIG. 11 shows a common information field 1100 for a trigger frame formatted in accordance with an existing trigger frame format. More specifically, the common information field 1100 conforms to the EHT variant common information field format defined by an initial release of the IEEE 802.11be amendment of the IEEE 802.11 standard. With reference for example to FIG. 10, the common information field 1100 may be one example of the common field 1020. In the example of FIG. 11, the common information field 1100 may be included in a trigger frame that is configured to solicit an EHT TB PPDU. Thus, the common information field 1100 includes a total of 11 reserved bits (in bit positions B22, B26, B53, B56-B62, and B63). In some implementations, up to 10 of the reserved bits may be repurposed to carry the RU guarantee information 1022. Aspects of the present disclosure recognize that the number of reserved bits in the common information field 1100 can support any of the signaling implementations for the RU guarantee information 1022, described above with reference to FIG. 9, except the 16-bit bitmap.

Figure 12:
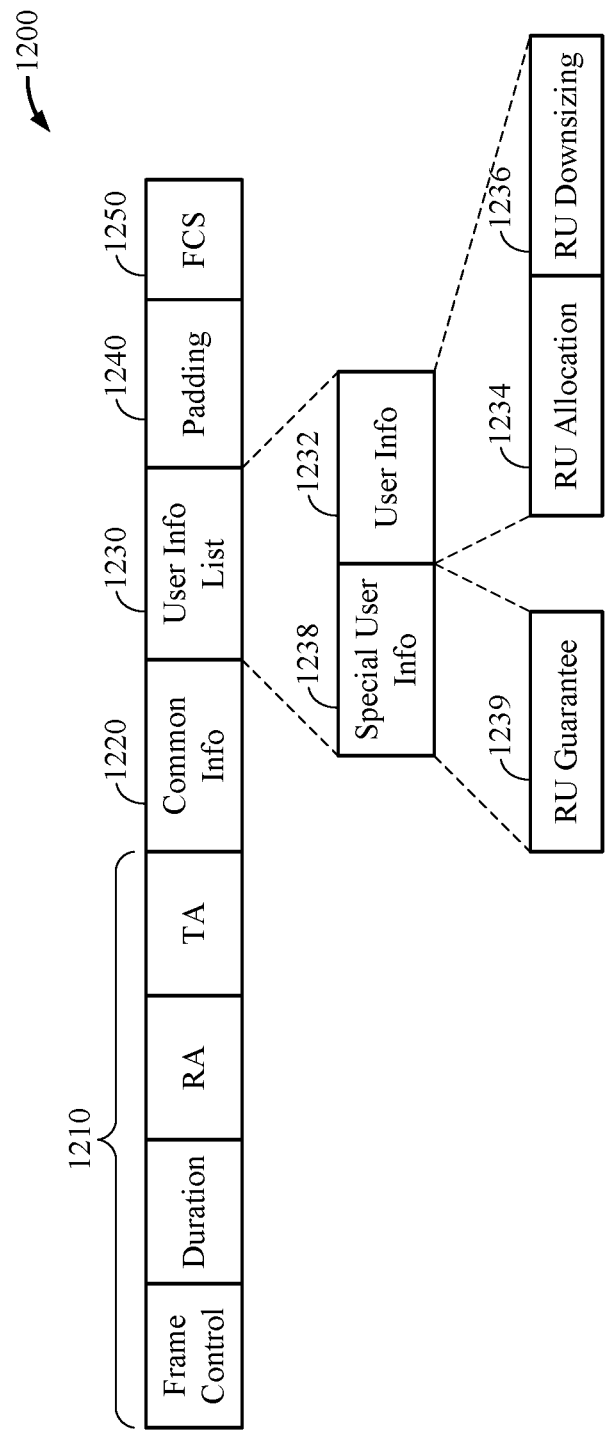
FIG. 12 shows another example trigger frame usable for communications between an AP and a number of STAs according to some implementations.

FIG. 12 shows another example trigger frame 1200 usable for communications between an AP and a number of STAs according to some implementations. In some implementations, the trigger frame 1200 may be one example of the trigger frame 600 of FIG. 6. For example, the trigger frame 1200 may be used to solicit a TB PPDU from one or more STAs. The trigger frame 1200 may allocate an RU or MRU to each STA for transmission in the TB PPDU. In some implementations, the trigger frame 1200 may allow RU downsizing for one or more RUs or MRUs within the TB PPDU.

The trigger frame 1200 includes a MAC header 1210, a common information field 1220, a user information list 1230, zero or more padding bits 1240, and an FCS 1250. The MAC header 1210 includes a frame control field, a duration field, an RA field, and a TA field. The common information field 1220 and user information list 1230 carry configuration information which may be used by a receiving device to configure a TB PPDU to be transmitted in response to receiving the trigger frame 1200. The user information list 1030 may include one or more user information fields 1032 each carrying per-user information for a respective user. In some implementations, each user information field 1232 may carry RU allocation information 1234 and RU downsizing information 1036. As described with reference to FIG. 6, the RU allocation information 1234 indicates an RU or MRU that is allocated for transmission in the TB PPDU and the RU downsizing information 1236 indicates whether RU downsizing is permitted for the respective RU or MRU.

In some implementations, the user information list 1230 may further include a special user information field 1238. As described with reference to FIG. 7, each of the user information fields 1232 is identified by a unique AID value assigned to a particular STA (or user) in a BSS. In contrast, a special user information field 1238 may be identified by an AID value that is not assigned to any STA in the BSS. In some implementations, the special user information field 1238 may carry RU guarantee information 1239 indicating one or more guaranteed tones to be included in the downsized RU or MRU. In some aspects, the RU guarantee information 1239 may include an 8-bit bitmap, where each bit of the bitmap represents a respective 40 MHz subchannel of a 320 MHz channel. In some other aspects, the RU guarantee information 1239 may signal a respective location of the guaranteed tones within each 80 MHz or 160 MHz subchannel of a 320 MHz channel. Still further, in some aspects, the RU guarantee information 1239 may signal at most one set of guaranteed tones within each 80 MHz or 160 MHz subchannel of a 320 MHz wireless channel. In some implementations, the RU guarantee information 1239 may replace one or more reserved bits in the common information field of a trigger frame format defined by existing versions of the IEEE 802.11 standard.

FIG. 13 shows a special user information field 1300 for a trigger frame formatted in accordance with an existing trigger frame format. More specifically, the special user information field 1300 conforms to the special user information field format defined by an initial release of the IEEE 802.11be amendment of the IEEE 802.11 standard. Thus, the AID12 subfield (in bit positions B0-B11) may carry an AID value equal to 2007. With reference for example to FIG. 12, the special user information field 1300 may be one example of the special user information field 1238. In the example of FIG. 13, the special user information field 1300 may be included in a basic trigger frame. Thus, the special user information field 1300 includes a total of 11 reserved bits (in bit position B37-B39 and B40-B47). In some implementations, up to 10 of the reserved bits may be repurposed to carry the RU guarantee information 1239. Aspects of the present disclosure recognize that the number of reserved bits in the special user information field 1300 can support any of the signaling implementations for the RU guarantee information 1239, described above with reference to FIG. 9, except for the 16-bit bitmap.

In some other implementations, the special user information field 1238 of the trigger frame 1200 may be a new special user information field. As described above, a special user information field may be any user information field associated with an AID value that is not assigned to any user or STA in a given BSS. As shown in FIG. 7, several AID values associated with the AID12 subfield are reserved (such as 2008-2044 and 2047-4094) in existing versions of the IEEE 802.11 standard. Thus, in some implementations, the special user information field 1238 may be assigned one or more of the reserved values associated with the AID12 subfield. In such implementations, any number of the remaining bits of the special user information field 1238 (after the AID12 subfield) can be repurposed to carry the RU guarantee information 1239. Aspects of the present disclosure recognize that the remaining bits of the special user information field 1238 can support any of the signaling implementations for the RU guarantee information 1239, described above with reference to FIG. 9, including the 16-bit bitmap.

As described above, the RU guarantee information indicates a set of guaranteed tones to be included in any downsized RU or MRU used to transmit a TB PPDU. The guaranteed tones ensure that the AP can recover the TB PPDU from the downsized RU or MRU on which it is transmitted. In some implementations, the PHY preamble of the TB PPDU may carry signaling information indicating the downsized RU or MRU (also referred to herein as "downsized signaling information"). Aspects of the present disclosure recognize that the PHY preamble of a TB PPDU is duplicated on each occupied 20 MHz subchannel of the channel width. In some aspects, each set of guaranteed tones may span at least a 20 MHz subchannel. Thus, the AP may observe the PHY preamble transmitted on the guaranteed tones to determine how to recover the remainder of the TB PPDU. For example, the AP may decode the downsized signaling information in the PHY preamble to determine the downsized RU or MRU associated with the TB PPDU.

Figure 14:
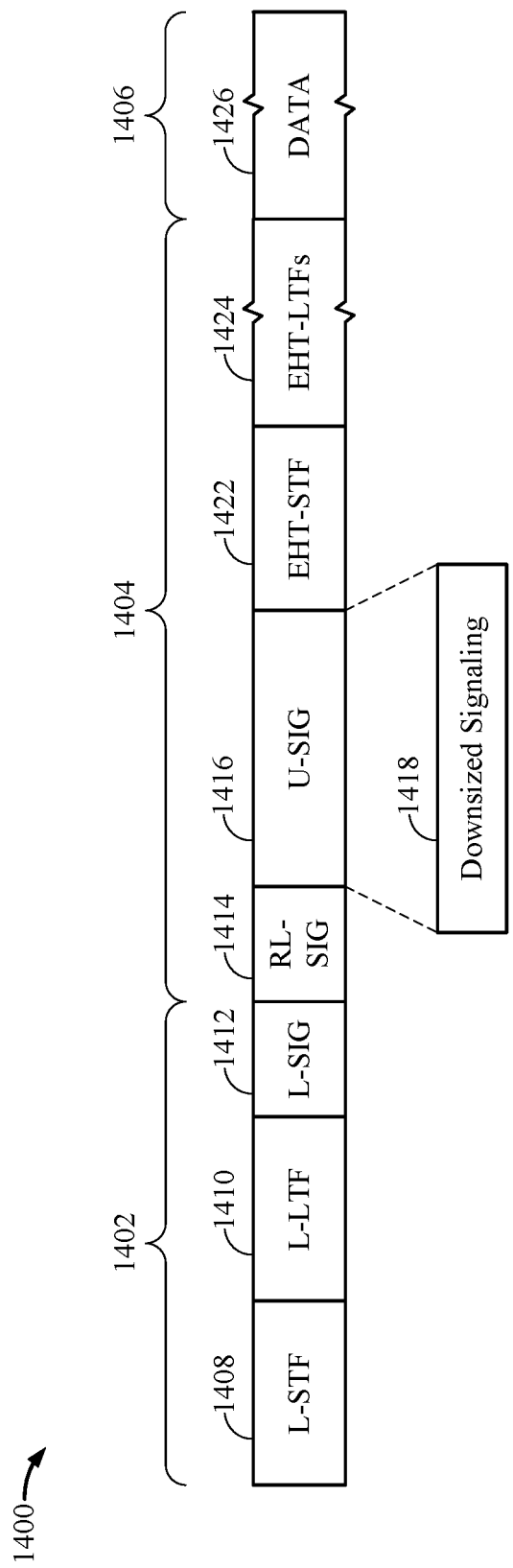
FIG. 14 shows an example trigger-based (TB) PPDU usable for communications between a STA and an AP according to some implementations.

FIG. 14 shows an example TB PPDU 1400 usable for communications between a STA and an AP according to some implementations. The TB PPDU 1400 includes a PHY preamble including a first portion 1402 and a second portion 1404. The TB PPDU 1400 may further include a PHY payload 1406 after the preamble, for example, in the form of a PSDU carrying a DATA field 1426. In some implementations, the TB PPDU 1400 may be formatted as a non-legacy or Extremely High Throughput (EHT) PPDU.

The first portion 1402 of the PHY preamble includes L-STF 1408, L-LTF 1410, and L-SIG 1412. The second portion 1404 of the PHY preamble includes a repeated legacy signal field (RL-SIG) 1414, a universal signal field (U-SIG) 1416, a non-legacy short training field (EHT-STF) 1422, and a number of non-legacy long training fields (EHT-LTFs) 1424. In the IEEE 802.11be amendment, and future generations of the IEEE 802.11 standard, new fields may be used to carry signaling information. At least some of the new fields and signaling information may be included in U-SIG 1416. For example, U-SIG 1416 may include signaling regarding types or formats of additional signal fields that may follow U-SIG 1416. In some implementations, U-SIG 1416 may carry downsizing signaling information 1418. The downsized signaling information 1418 may indicate whether RU downsizing is performed in the TB PPDU 1400 and the downsized RU or MRU associated with the TB PPDU 1400 (if RU downsizing is performed).

In some implementations, the downsized signaling information 1418 may include a value that maps to an entry in a LUT. More specifically, each entry in the LUT may indicate a respective downsized RU or MRU. With reference for example to FIG. 9, a first entry in the LUT (having a value equal to 0) may indicate the 996-tone RU associated with the allocated tones 902; a second entry in the LUT (having a value equal to 1) may indicate the 484+242-tone RU associated with the downsized tone configuration 912; a third entry in the LUT (having a value equal to 2) may indicate the 484+242-tone RU associated with the downsized tone configuration 914; a fourth entry in the LUT (having a value equal to 3) may indicate the 484+242-tone RU associated with the downsized tone configuration 916; and a fifth entry in the LUT (having a value equal to 4) may indicate the 484+242-tone RU associated with the downsized tone configuration 918.

In some other implementations, the downsized signaling information 1418 may include a first bit to indicate whether RU downsizing is performed (also referred to as a "downsizing bit") and a number of bits to indicate a location of a dropped RU (also referred to as "location bits"). As shown in FIG. 9, each of the downsized tone configurations 912-918 includes a hole or gap in the 80 MHz channel associated with the allocated tones 902. For example, the downsized tone configuration 912 includes a 20 MHz gap coinciding with the $2^{nd}$ 20 MHz subchannel of the 80 MHz channel. The width of each gap is equal to the size of an RU (or MRU). Thus, the gap in each downsized tone configuration is referred to herein as a "dropped RU." In some aspects, the size of the dropped RU may vary. For example, the dropped RU in each of the downsized tone configuration 912-916 is the size of a 242-tone RU whereas the dropped RU in the downsized tone configuration 918 is the size of a 484-tone RU. Thus, in some implementations, the downsized signaling information 1418 may include an additional one or more bits to indicate the resolution or size of the dropped RU (also referred to as a "resolution bit").

The location bits may indicate the location of the dropped RU in the frequency domain. With reference for example to FIG. 9, the location bits may indicate which of the 20 MHz (or 40 MHz) subchannels is associated with the dropped RU. In some aspects, the value of the location bits may indicate the location of the dropped RU in increasing order of frequency (excluding the guaranteed tones), where the lowest value represents the lowest-frequency subchannel. Table 4 shows example bit configurations that can be used to indicate each of the resource allocations depicted in FIG. 9.

TABLE 4

| Tone Configuration | Downsizing Bit | Resolution Bit | Location Bits |
|---|---|---|---|
| 902 | 0 | Any | Any |
| 912 | 1 | 0 | 00 |
| 914 | 1 | 0 | 01 |
| 916 | 1 | 0 | 10 |
| 918 | 1 | 1 | 00 |

Figure 15:
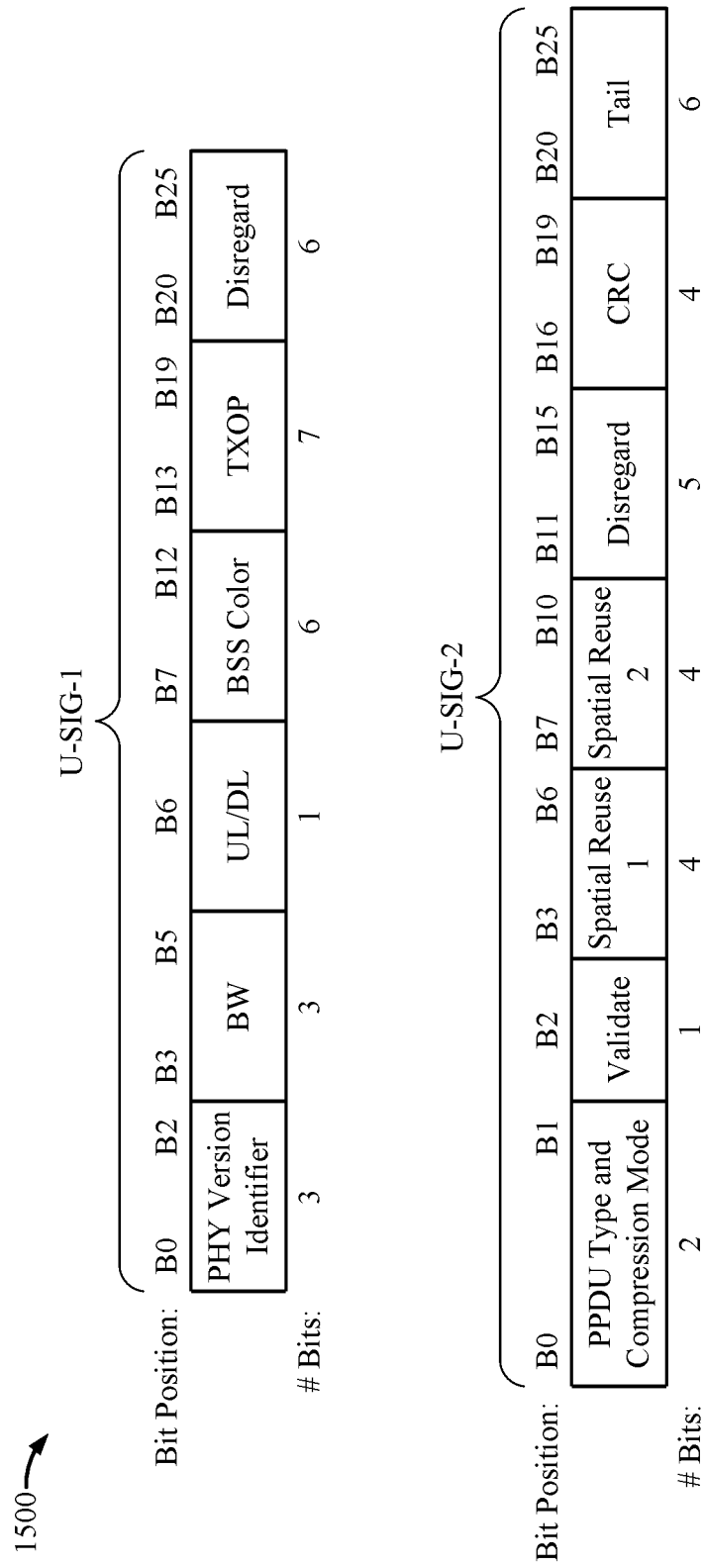
FIG. 15 shows a universal signal field (U-SIG) for a PPDU formatted in accordance with an existing PPDU format.

FIG. 15 shows a U-SIG 1500 for a PPDU formatted in accordance with an existing PPDU format. More specifically, U-SIG 1500 conforms to the EHT TB PPDU format defined by an initial release of the IEEE 802.11be amendment of the IEEE 802.11 standard. With reference for example to FIG. 14, U-SIG 1500 may be one example of U-SIG 1416. In accordance with the EHT TB PPDU format, reserved bits are further subdivided into validate bits and disregard bits. The validate bits are used to indicate whether a STA should continue receiving the PPDU whereas the disregard bits may be ignored by the receiving STA. Aspects of the present disclosure recognize that disregard bits may be repurposed to carry the downsized signaling information 1418. As shown in FIG. 15, U-SIG 1500 includes a total of 11 disregard bits distributed across two U-SIG symbols (U-SIG-1 and U-SIG-2). More specifically, U-SIG 1500 includes 6 disregard bits in U-SIG-1 (in bit positions B20-B25) and 5 disregard bits in U-SIG-2 (in bit positions B11-B15). In some implementations, the downsized signaling information 1418 may reuse up to 11 of the disregard bits in U-SIG 1500.

Figure 16:
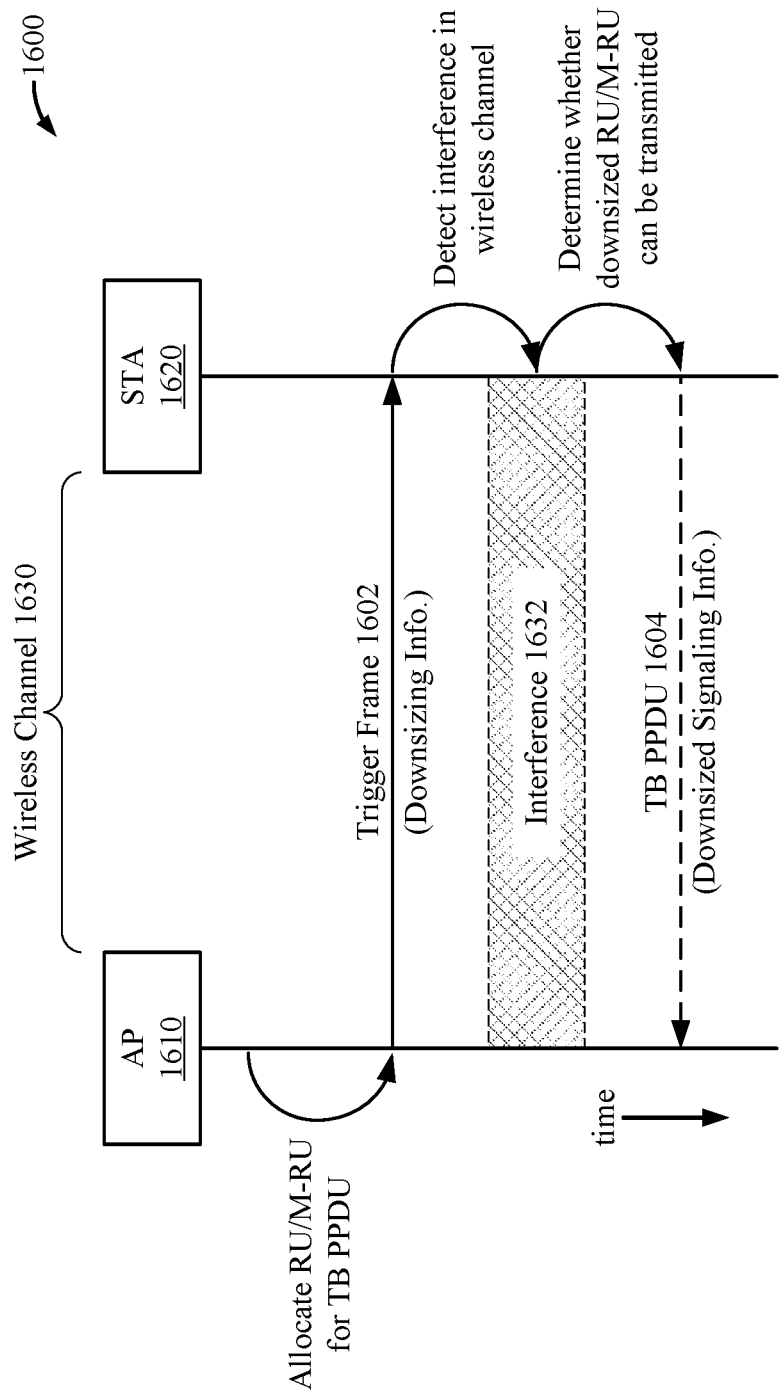
FIG. 16 shows a sequence diagram depicting an example message exchange between an AP and a STA in a wireless network.

FIG. 16 shows a sequence diagram 1600 depicting an example message exchange between an AP 1610 and a STA 1620 in a wireless network. In some implementations, the AP 1610 may be one example of the APs 102 or 502 of FIGS. 1 and 5A, respectively, and the STA 1620 may be one example of any of the STAs 104 or 504 of FIGS. 1 and 5B, respectively.

The AP 1610 allocates an RU or MRU for a TB PPDU 1604 to be transmitted by the STA 1620. The RU or MRU represents a wireless channel 1630 on which the TB PPDU 1604 is to be transmitted. Thus, the AP 1610 may select the RU or MRU based on the conditions of the wireless channel 1630. The AP 1610 transmits a trigger frame 1602 soliciting the TB PPDU 1604 from the STA 1620. In some implementations, the trigger frame 1602 may be one example of any of the trigger frames 600, 1000, 1200, 1400 of FIGS. 6, 10, 12, and 14, respectively. Thus, the trigger frame 1602 may carry RU allocation information indicating the allocated RU or MRU in addition to RU downsizing information indicating whether RU downsizing is permitted in the TB PPDU 1604.

The STA 1620 receives the trigger frame 1602 from the AP 1610 and listens to the wireless channel 1630. For example, the STA 1620 may perform clear channel assessment (CCA) on the wireless channel 1630 to determine whether the channel is busy or available for transmission of the TB PPDU 1604. In the example of FIG. 16, the STA 1620 detects interference 1632 on a portion of the wireless channel 1630. For example, the interference 1632 may be caused by wireless communications between other devices in the vicinity of the STA 1620 (such as in an overlapping BSS). In other words, the interference 1632 may be due to the medium being busy. Thus, the STA 1620 may determine whether RU downsizing is permitted by the trigger frame 1602 based on detecting the interference 1632 in the wireless channel.

In some implementations, the STA 1620 may selectively transmit the TB PPDU 1604 based on the RU downsizing information in the received trigger frame 1602. For example, if the RU downsizing information indicates that RU downsizing is not permitted, the STA 1620 may not transmit the TB PPDU 1604. On the other hand, if the RU downsizing information indicates that RU downsizing is permitted, the STA 1620 may determine whether interference 1632 coincides with a set of guaranteed tones to be included in any downsized RU or MRU. In some aspects, the STA 1620 may determine the location of the guaranteed tones based on the location of a primary 20 MHz subchannel within the wireless channel 1630. In some other aspects, the STA 1620 may receive RU guarantee information from the AP 1610 indicating the location of the guaranteed tones (such as described with reference to FIGS. 9-13).

If the interference 1632 coincides with one or more of the guaranteed tones, the STA 1620 may not transmit the TB PPDU 1604. On the other hand, if the interference 1632 does not coincide with any of the guaranteed tones, the STA 1620 may transmit the TB PPDU 1604 using a downsized RU or MRU that avoids the interference 1632. As described with reference to FIGS. 8 and 9, the downsized RU or MRU may include a subset of the tones associated with the RU or MRU allocated by the trigger frame 1602. In some implementations, the TB PPDU 1604 may include downsized signaling information indicating that RU downsizing is performed in the TB PPDU 1604 as well as the downsized RU or MRU associated with the TB PPDU 1604 (such as described with reference to FIGS. 14 and 15).

Figure 17:
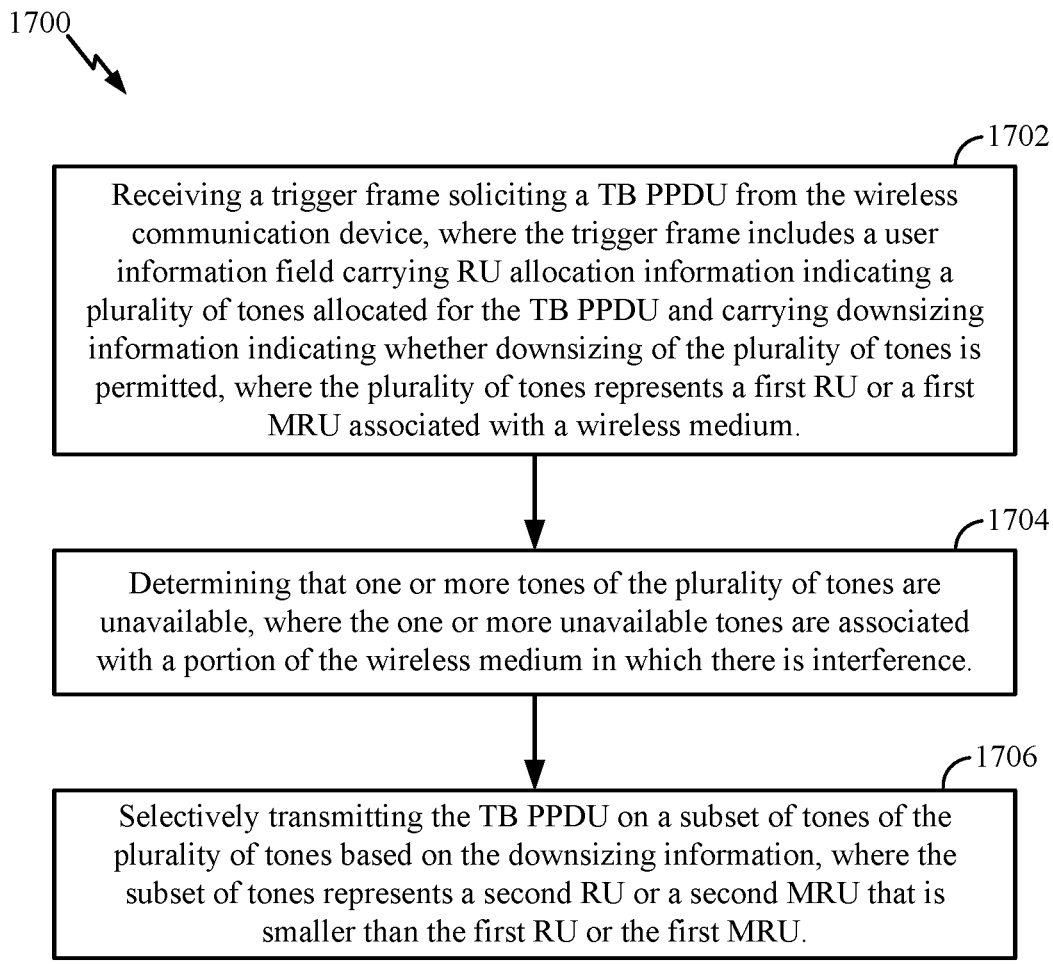
FIG. 17 shows a flowchart illustrating an example process for wireless communication that supports resource unit (RU) downsizing according to some implementations.

FIG. 17 shows a flowchart illustrating an example process 1700 for wireless communication that supports RU downsizing according to some implementations. In some implementations, the process 1700 may be performed by a wireless communication device operating as or within a network node, such as one of the STAs 104 or 504 described above with reference to FIGS. 1 and 5B, respectively In some implementations, the process 1700 begins in block 1702 with receiving a trigger frame soliciting a TB PPDU from the wireless communication device, where the trigger frame includes a user information field carrying RU allocation information indicating a plurality of tones allocated for the TB PPDU and carrying downsizing information indicating whether downsizing of the plurality of tones is permitted, where the plurality of tones represents a first RU or a first MRU associated with a wireless medium. In some aspects, the downsizing information may be indicated by a value of a downsizing bit in the user information field. In some other aspects, the RU allocation information and the downsizing information may be collectively indicated by a value of an RU allocation subfield of the user information field.

In block 1704, the process 1700 proceeds with determining that one or more tones of the plurality of tones are unavailable, where the one or more unavailable tones are associated with a portion of the wireless medium in which there is interference. In block 1706, the process 1700 proceeds with selectively transmitting the TB PPDU on a subset of tones of the plurality of tones based on the downsizing information, where the subset of tones represents a second RU or a second MRU that is smaller than the first RU or the first MRU. In some implementations, the TB PPDU may include a PHY preamble having a U-SIG that carries downsized signaling information indicating the subset of tones. In some aspects, the downsized signaling information may map to one of a plurality of entries in an LUT, where each entry indicates a respective RU or MRU. In some other aspects, the downsized signaling information may indicate the remaining tones of the plurality of tones that are not included in the subset, where the remaining tones represent a third RU or a third MRU.

In some implementations, the process 1700 may include receiving RU guarantee information indicating one or more tones of the plurality of tones guaranteed to be associated with the TB PPDU and selecting the subset of tones to exclude the one or more unavailable tones and include the one or more guaranteed tones. In some aspects, the RU guarantee information may be carried in a common information field that precedes the user information field in the trigger frame, where the common information field carries information that is common to each user associated with the trigger frame. In some other aspects, the RU guarantee information may be carried in a special user information field of the trigger frame, where the special user information field is identified by an AID value not assigned to any wireless communication devices associated with the same BSS as the wireless communication device. Still further, in some aspects, the RU guarantee information may be received in a management frame prior to the reception of the trigger frame.

In some implementations, the RU guarantee information may include a bitmap, where each bit of the bitmap indicates whether a respective subchannel of a wireless channel is associated with the one or more guaranteed tones. In some other implementations, the RU guarantee information may include one or more pairs of bits, where each of the one or more pairs of bits indicates which 20 MHz subchannel of a respective 80 MHz channel is associated with the one or more guaranteed tones. In some other implementations, the RU guarantee information may include one or more pairs of bits, where each of the one or more pairs of bits indicates which 40 MHz subchannel of a respective 160 MHz channel is associated with the one or more guaranteed tones. Still further, in some implementations, the RU guarantee information may map to one of a plurality of entries in an LUT, where each entry in the LUT indicates a respective combination of one or more subchannels of a wireless channel that are associated with the one or more guaranteed tones.

Figure 18:
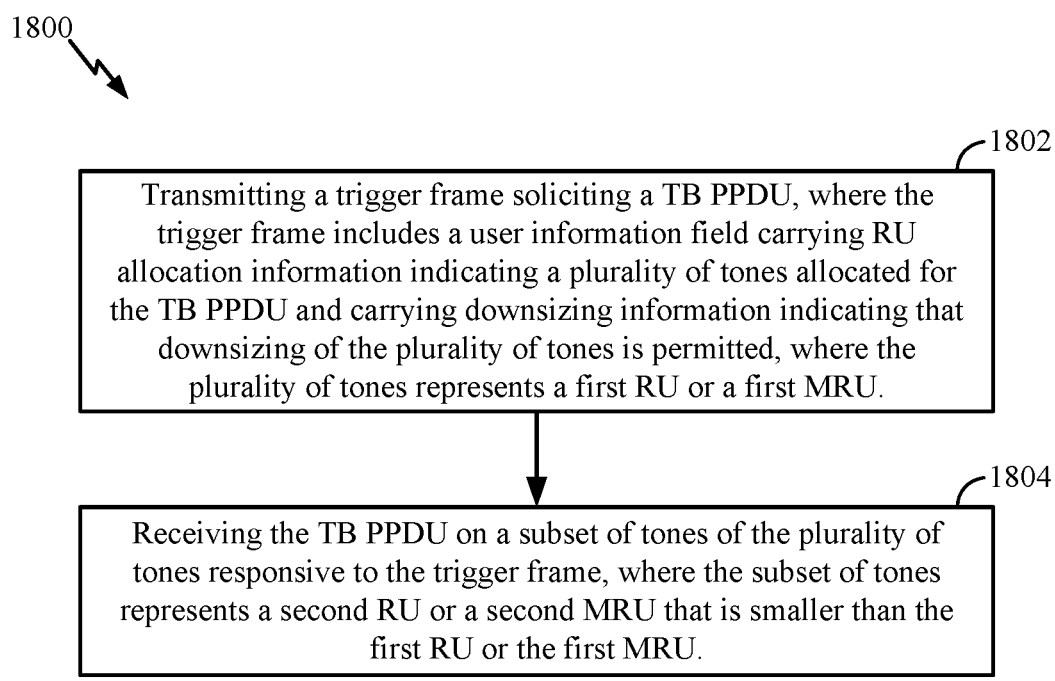
FIG. 18 shows a flowchart illustrating an example process for wireless communication that supports RU downsizing according to some implementations.

FIG. 18 shows a flowchart illustrating an example process 1800 for wireless communication that supports RU downsizing according to some implementations. In some implementations, the process 1800 may be performed by a wireless communication device operating as or within an AP such as one of the APs 102 or 502 of FIGS. 1 and 5A, respectively.

In some implementations, the process 1800 begins in block 1802 with transmitting a trigger frame soliciting a TB PPDU, where the trigger frame includes a user information field carrying RU allocation information indicating a plurality of tones allocated for the TB PPDU and carrying downsizing information indicating that downsizing of the plurality of tones is permitted, where the plurality of tones represents a first RU or a first MRU. In some aspects, the downsizing information may be indicated by a value of a downsizing bit in the user information field. In some other aspects, the RU allocation information and the downsizing information are collectively indicated by a value of an RU allocation subfield of the user information field.

In block 1804, the process 1800 proceeds with receiving the TB PPDU on a subset of tones of the plurality of tones responsive to the trigger frame, where the subset of tones represents a second RU or a second MRU that is smaller than the first RU or the first MRU. In some implementations, the TB PPDU may include a PHY preamble having a U-SIG that carries downsized signaling information indicating the subset of tones. In some aspects, the downsized signaling information may map to one of a plurality of entries in an LUT, where each entry in the LUT indicates a respective RU or MRU. In some other aspects, the downsized signaling information may indicate the remaining tones of the plurality of tones that are not included in the subset, where the remaining tones represent a third RU or a third MRU.

In some implementations, the process 1800 may include transmitting RU allocation information indicating one or more tones of the plurality of tones guaranteed to be associated with the TB PPDU, where the subset of tones includes at least the one or more guaranteed tones. In some aspects, the RU guarantee information may be carried in a common information field that precedes the user information field in the trigger frame, where the common information field carries information that is common to each user associated with the trigger frame. In some other aspects, the RU guarantee information may be carried in a special user information field of the trigger frame, where the special user information field is identified by an AID value not assigned to any wireless communication devices associated with the wireless communication device. Still further, in some aspects, the RU guarantee information may be carried in a management frame transmitted prior to the transmission of the trigger frame.

In some implementations, the RU guarantee information may include a bitmap, where each bit of the bitmap indicates whether a respective subchannel of a wireless channel is associated with the one or more guaranteed tones. In some other implementations, the RU guarantee information may include one or more pairs of bits, where each of the one or more pairs of bits indicates which 20 MHz subchannel of a respective 80 MHz channel is associated with the one or more guaranteed tones. In some other implementations, the RU guarantee information may include one or more pairs of bits, where each of the one or more pairs of bits indicates which 40 MHz subchannel of a respective 160 MHz channel is associated with the one or more guaranteed tones. Still further, in some implementations, the RU guarantee information may map to one of a plurality of entries in an LUT, where each entry in the LUT indicates a respective combination of one or more subchannels of a wireless channel that are associated with the one or more guaranteed tones.

Figure 19:
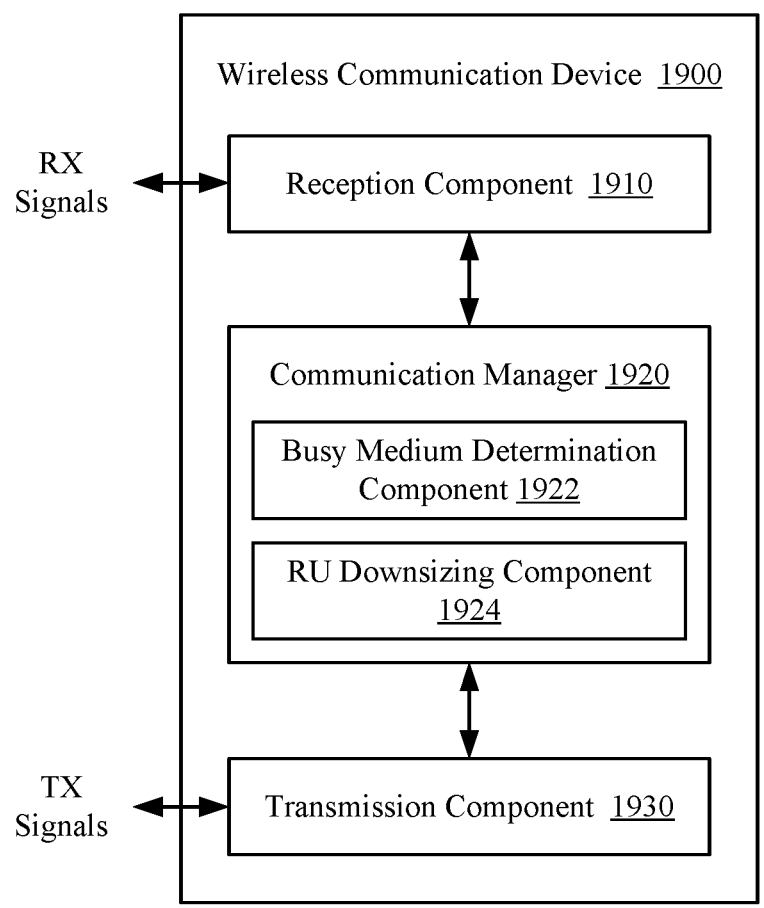
FIG. 19 shows a block diagram of an example wireless communication device according to some implementations.

FIG. 19 shows a block diagram of an example wireless communication device according to some implementations. In some implementations, the wireless communication device 1900 is configured to perform the process 1700 described above with reference to FIG. 17. The wireless communication device 1900 can be an example implementation of the wireless communication device 400 described above with reference to FIG. 4. For example, the wireless communication device 1900 can be a chip, SoC, chipset, package or device that includes at least one processor and at least one modem (for example, a Wi-Fi (IEEE 802.11) modem or a cellular modem).

The wireless communication device 1900 includes a reception component 1910, a communication manager 1920, and a transmission component 1930. The communication manager 1920 further includes a busy medium determination component 1922 and an RU downsizing component 1924. Portions of one or more of the components 1922 and 1924 may be implemented at least in part in hardware or firmware. In some implementations, at least some of the components 1922 or 1924 are implemented at least in part as software stored in a memory (such as the memory 408). For example, portions of one or more of the components 1922 and 1924 can be implemented as non-transitory instructions (or "code") executable by a processor (such as the processor 406) to perform the functions or operations of the respective component.

The reception component 1910 is configured to receive RX signals, over a wireless channel, from one or more other wireless communication devices. In some implementations, the RX signals may include a trigger frame soliciting a TB PPDU, where the trigger frame includes a user information field carrying RU allocation information indicating a plurality of tones allocated for the TB PPDU and carrying downsizing information indicating whether downsizing of the plurality of tones is permitted, where the plurality of tones represents a first RU or a first MRU. The communication manager 1920 is configured to control or manage communications with the one or more other wireless communication devices. In some implementations, the busy medium determination component 1922 may determine that one or more tones of the plurality of tones are unavailable, where the one or more unavailable tones is associated with a portion of the wireless medium in which there is interference; and the RU downsizing component 1924 may selectively transmit the TB PPDU on a subset of tones of the plurality of tones based on the downsizing information, where the subset of tones represents a second RU or a second MRU that is smaller than the first RU or the first MRU. The transmission component 1930 is configured to transmit TX signals, over the wireless channel, to one or more other wireless communication devices.

Figure 20:
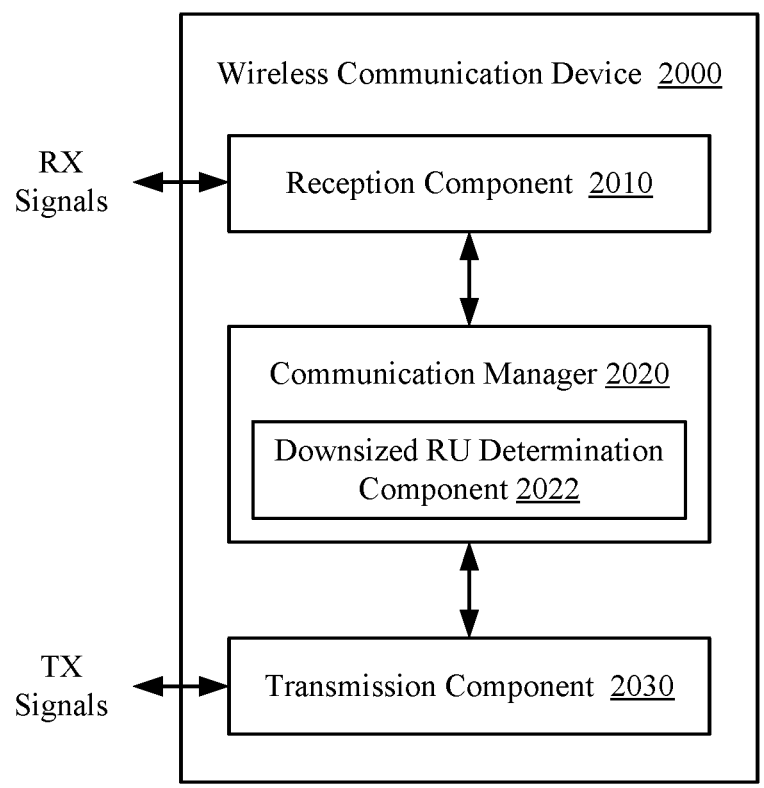
FIG. 20 shows a block diagram of an example wireless communication device according to some implementations.

FIG. 20 shows a block diagram of an example wireless communication device 2000 according to some implementations. In some implementations, the wireless communication device 2000 is configured to perform the process 1800 described above with reference to FIG. 18. The wireless communication device 2000 can be an example implementation of the wireless communication device 400 described above with reference to FIG. 4. For example, the wireless communication device 2000 can be a chip, SoC, chipset, package or device that includes at least one processor and at least one modem (for example, a Wi-Fi (IEEE 802.11) modem or a cellular modem).

The wireless communication device 2000 includes a reception component 2010, a communication manager 2020, and a transmission component 2030. The communication manager 2020 further includes a downsized RU determination component 2022. Portions of the downsized RU determination component 2022 may be implemented at least in part in hardware or firmware. In some implementations, the downsized RU determination component 2022 is implemented at least in part as software stored in a memory (such as the memory 408). For example, portions of the downsized RU determination component 2022 can be implemented as non-transitory instructions (or "code") executable by a processor (such as the processor 406) to perform the functions or operations of the respective component.

The reception component 2010 is configured to receive RX signals, over a wireless channel, from one or more other wireless communication devices. The transmission component 2030 is configured to transmit TX signals, over the wireless channel, to one or more other wireless communication devices. In some implementations, the TX signals may include a trigger frame soliciting a TB PPDU, where the trigger frame includes a user information field carrying RU allocation information indicating a plurality of tones allocated for the TB PPDU and carrying downsizing information indicating that downsizing of the plurality of tones is permitted, where the plurality of tones represents a first RU or a first MRU. The communication manager 2020 is configured to control or manage communications with the one or more other wireless communication devices. In some implementations, the downsized RU determination component 2022 may receive the TB PPDU on a subset of tones of the plurality of tones responsive to the trigger frame, where the subset of tones represents a second RU or a second MRU that is smaller than the first RU or the first MRU.

Implementation examples are described in the following numbered clauses:

1. A method for wireless communication by a wireless communication device, including:
   receiving a trigger frame soliciting a trigger-based (TB) physical layer convergence protocol (PLCP) protocol data unit (PPDU) from the wireless communication device, the trigger frame including a user information field carrying resource unit (RU) allocation information indicating a plurality of tones allocated for the TB PPDU and carrying downsizing information indicating whether downsizing of the plurality of tones is permitted, the plurality of tones representing a first RU or a first multiple resource unit (MRU) associated with a wireless medium;
   determining that one or more tones of the plurality of tones are unavailable, the one or more unavailable tones being associated with a portion of the wireless medium in which there is interference; and
   selectively transmitting the TB PPDU on a subset of tones of the plurality of tones based on the downsizing information, the subset of tones representing a second RU or a second MRU that is smaller than the first RU or the first MRU.
2. The method of clause 1, where the downsizing information is indicated by a value of a downsizing bit in the user information field.
3. The method of clause 1, where the RU allocation information and the downsizing information are collectively indicated by a value of an RU allocation subfield of the user information field.
4. The method of any of clauses 1-3, further including:
   receiving RU guarantee information indicating one or more tones of the plurality of tones guaranteed to be associated with the TB PPDU; and
   selecting the subset of tones to exclude the one or more unavailable tones and include at least the one or more guaranteed tones.
5. The method of any of clauses 1-4, where the RU guarantee information is carried in a common information field that precedes the user information field in the trigger frame, the common information field carrying information that is common to each user associated with the trigger frame.
6. The method of any of clauses 1-4, where the RU guarantee information is carried in a special user information field of the trigger frame, the special user information field being identified by an association identifier (AID) value not assigned to any wireless communication devices associated with the same basic service set (BSS) as the wireless communication device.
7. The method of any of clauses 1-4, where the receiving of the RU guarantee information includes:
receiving a management frame, prior to the reception of the trigger frame, that carries the RU guarantee information.
8. The method of any of clauses 1-7, where the RU guarantee information includes a bitmap, each bit of the bitmap indicating whether a respective subchannel of a wireless channel is associated with the one or more guaranteed tones.
9. The method of any of clauses 1-7, where the RU guarantee information includes one or more pairs of bits, each of the one or more pairs of bits indicating which 20 MHz subchannel of a respective 80 MHz channel is associated with the one or more guaranteed tones.
10. The method of any of clauses 1-7, where the RU guarantee information includes one or more pairs of bits, each of the one or more pairs of bits indicating which 40 MHz subchannel of a respective 160 MHz channel is associated with the one or more guaranteed tones.
11. The method of any of clauses 1-7, where the RU guarantee information maps to one of a plurality of entries in a lookup table (LUT), each entry in the LUT indicating a respective combination of one or more subchannels of a wireless channel that are associated with the one or more guaranteed tones.
12. The method of any of clauses 1-11, where the TB PPDU includes a physical layer preamble having a universal signal field (U-SIG) that carries downsized signaling information indicating the subset of tones.
13. The method of any of clauses 1-12, where the downsized signaling information maps to one of a plurality of entries in an LUT, each entry in the LUT indicating a respective RU or MRU.
14. The method of any of clauses 1-2, where the downsized signaling information indicates the remaining tones of the plurality of tones that are not included in the subset, the remaining tones representing a third RU or a third MRU.
15. A wireless communication device including:
at least one modem;
at least one processor communicatively coupled with the at least one modem; and
at least one memory communicatively coupled with the at least one processor and storing processor-readable code that, when executed by the at least one processor in conjunction with the at least one modem, is configured to perform the method of any one or more of clauses 1-14.
16. A method for wireless communication performed by a wireless communication device, including:
transmitting a trigger frame soliciting a trigger-based (TB) physical layer convergence protocol (PLCP) protocol data unit (PPDU), the trigger frame including a user information field carrying resource unit (RU) allocation information indicating a plurality of tones allocated for the TB PPDU and carrying downsizing information indicating that downsizing of the plurality of tones is permitted, the plurality of tones representing a first RU or a first multiple resource unit (MRU); and
receiving the TB PPDU on a subset of tones of the plurality of tones responsive to the trigger frame, the subset of tones representing a second RU or a second MRU that is smaller than the first RU or the first MRU.
17. The method of clause 16, where the downsizing information is indicated by a value of a downsizing bit in the user information field.
18. The method of clause 16, where the RU allocation information and the downsizing information are collectively indicated by a value of an RU allocation subfield of the user information field.
19. The method of any of clauses 16-18, further including:
transmitting RU allocation information indicating one or more tones of the plurality of tones guaranteed to be associated with the TB PPDU, the subset of tones including at least the one or more guaranteed tones.
20. The method of any of clauses 16-19, where the RU guarantee information is carried in a common information field that precedes the user information field in the trigger frame, the common information field carrying information that is common to each user associated with the trigger frame.
21. The method of any of clauses 16-19, where the RU guarantee information is carried in a special user information field of the trigger frame, the special user information field being identified by an association identifier (AID) value not assigned to any wireless communication devices associated with the wireless communication device.
22. The method of any of clauses 16-19, where the transmitting of the RU allocation information includes:
transmitting a management frame, prior to the transmission of the trigger frame, that carries the RU guarantee information.
23. The method of any of clauses 16-22, where the RU guarantee information comprises a bitmap, each bit of the bitmap indicating whether a respective subchannel of a wireless channel is associated with the one or more guaranteed tones.
24. The method of any of clauses 16-23, where the RU guarantee information comprises one or more pairs of bits, each of the one or more pairs of bits indicating which 20 MHz subchannel of a respective 80 MHz channel is associated with the one or more guaranteed tones.
25. The method of any of clauses 16-23, where the RU guarantee information comprises one or more pairs of bits, each of the one or more pairs of bits indicating which 40 MHz subchannel of a respective 160 MHz channel is associated with the one or more guaranteed tones.
26. The method of any of clauses 16-23, where the RU guarantee information maps to one of a plurality of entries in a lookup table (LUT), each entry in the LUT indicating a respective combination of one or more subchannels of a wireless channel that are associated with the one or more guaranteed tones.
27. The method of any of clauses 16-26, where the TB PPDU includes a physical layer preamble having a universal signal field (U-SIG) that carries downsized signaling information indicating the subset of tones.
28. The method of any of clauses 16-27, where the downsized signaling information maps to one of a plurality of entries in an LUT, each entry in the LUT indicating a respective RU or MRU.
29. The method of any of clauses 16-27, where the downsized signaling information indicates the remaining tones of the plurality of tones that are not included in the subset, the remaining tones representing a third RU or a third MRU.

30. A wireless communication device including:
   at least one modem;
   at least one processor communicatively coupled with the at least one modem; and
   at least one memory communicatively coupled with the at least one processor and storing processor-readable code that, when executed by the at least one processor in conjunction with the at least one modem, is configured to perform the method of any one or more of clauses 16-29.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method for wireless communication performed by a wireless communication device, comprising:
   receiving a trigger frame soliciting a trigger-based (TB) physical layer convergence protocol (PLCP) protocol data unit (PPDU) from the wireless communication device, the trigger frame including, collectively in a resource unit (RU) allocation subfield of a user information field, RU allocation information indicating a plurality of tones allocated for the TB PPDU and downsizing information indicating whether downsizing of the plurality of tones is permitted, the plurality of tones representing a first RU or a first multiple resource unit (MRU) associated with a wireless medium; and
   selectively transmitting the TB PPDU based on the downsizing information and in accordance with whether a portion of the wireless medium is unavailable.

2. The method of claim 1, wherein the downsizing information is indicated by a value of a downsizing bit in the user information field.

3. The method of claim 1, further comprising:
   receiving RU guarantee information indicating one or more tones of the plurality of tones guaranteed to be associated with the TB PPDU; and
   selecting a subset of tones of the plurality of tones to exclude one or more unavailable tones and include at least the one or more guaranteed tones, wherein the TB PPDU is selectively transmitted via the subset of tones.

4. The method of claim 3, wherein the RU guarantee information is carried in a common information field that precedes the user information field in the trigger frame, the common information field carrying information that is common to each user associated with the trigger frame.

5. The method of claim 3, wherein the RU guarantee information is carried in a special user information field of the trigger frame, the special user information field being identified by an association identifier (AID) value not assigned to any wireless communication devices associated with a same basic service set (BSS) as the wireless communication device.

6. The method of claim 3, wherein the receiving of the RU guarantee information comprises:
   receiving a management frame, prior to the trigger frame, that carries the RU guarantee information.

7. The method of claim 3, wherein the RU guarantee information comprises a bitmap, each bit of the bitmap indicating whether a respective subchannel of a wireless channel is associated with the one or more guaranteed tones.

8. The method of claim 3, wherein the RU guarantee information comprises one or more pairs of bits, each of the one or more pairs of bits indicating which 20 MHz subchannel of a respective 80 MHz channel is associated with the one or more guaranteed tones.

9. The method of claim 3, wherein the RU guarantee information comprises one or more pairs of bits, each of the one or more pairs of bits indicating which 40 MHz subchannel of a respective 160 MHz channel is associated with the one or more guaranteed tones.

10. The method of claim 3, wherein the RU guarantee information maps to one of a plurality of entries in a lookup table (LUT), each entry in the LUT indicating a respective combination of one or more subchannels of a wireless channel that are associated with the one or more guaranteed tones.

11. The method of claim 1, wherein the TB PPDU includes a physical layer preamble having a universal signal field (U-SIG) that carries downsized signaling information indicating a subset of tones of the plurality of tones.

12. The method of claim 11, wherein the downsized signaling information maps to one of a plurality of entries in an LUT, each entry in the LUT indicating a respective RU or MRU.

13. The method of claim 11, wherein the downsized signaling information indicates remaining tones of the plurality of tones that are not included in the subset, the remaining tones representing a third RU or a third MRU.

14. The method of claim 1, wherein selectively transmitting the TB PPDU comprises:
transmitting the TB PPDU via a subset of tones of the plurality of tones in accordance with the portion of the wireless medium being unavailable, the subset of tones representing a second RU or a second MRU that is smaller than the first RU or the first MRU.

15. The method of claim 14, further comprising:
determining that one or more tones of the plurality of tones are unavailable, the one or more unavailable tones being associated with the portion of the wireless medium, wherein the subset of tones excludes the one or more unavailable tones.

16. A wireless communication device comprising:
one or more memories that store processor-executable code; and
one or more processors coupled with the one or more memories and configured to, in association with executing the code, cause the wireless communication device to:
receive a trigger frame soliciting a trigger-based (TB) physical layer convergence protocol (PLCP) protocol data unit (PPDU) from the wireless communication device, the trigger frame including, collectively in a resource unit (RU) allocation subfield of a user information field, RU allocation information indicating a plurality of tones allocated for the TB PPDU and downsizing information indicating whether downsizing of the plurality of tones is permitted, the plurality of tones representing a first RU or a first multiple resource unit (MRU) associated with a wireless medium; and
selectively transmit the TB PPDU based on the downsizing information and in accordance with whether a portion of the wireless medium is unavailable.

17. The wireless communication device of claim 16, wherein the one or more processors are further configured to, in association with executing the code, cause the wireless communication device to:
receive RU guarantee information indicating one or more guaranteed tones of the plurality of tones; and
select a subset of tones to exclude one or more tones that are unavailable and include at least the one or more guaranteed tones, wherein the TB PPDU is selectively transmitted via the subset of tones.

18. The wireless communication device of claim 16, wherein the TB PPDU includes a physical layer preamble having a universal signal field (U-SIG) that carries downsized signaling information indicating a subset of tones of the plurality of tones.

19. A method for wireless communication performed by a wireless communication device, comprising:
transmitting a trigger frame soliciting a trigger-based (TB) physical layer convergence protocol (PLCP) protocol data unit (PPDU), the trigger frame including, collectively in a resource unit (RU) allocation subfield of a user information field, RU allocation information indicating a plurality of tones allocated for the TB PPDU and downsizing information indicating that downsizing of the plurality of tones is permitted, the plurality of tones representing a first RU or a first multiple resource unit (MRU) associated with a wireless medium; and
receiving the TB PPDU responsive to the trigger frame and in accordance with whether a portion of the wireless medium is unavailable.

20. The method of claim 19, wherein the downsizing information is indicated by a value of a downsizing bit in the user information field.

21. The wireless communication device of claim 16, wherein, to transmit the TB PPDU, the one or more processors are further configured to, in association with executing the code, cause the wireless communication device to:
transmit the TB PPDU via a subset of tones of the plurality of tones in accordance with the portion of the wireless medium being unavailable, the subset of tones representing a second RU or a second MRU that is smaller than the first RU or the first MRU.

22. The wireless communication device of claim 21, wherein the one or more processors are further configured to, in association with executing the code, cause the wireless communication device to:
determine that one or more tones of the plurality of tones are unavailable, the one or more unavailable tones being associated with the portion of the wireless medium, wherein the subset of tones excludes the one or more unavailable tones.

23. The wireless communication device of claim 16, wherein the downsizing information is indicated by a value of a downsizing bit in the user information field.

24. The wireless communication device of claim 17, wherein the RU guarantee information is carried in a common information field that precedes the user information field in the trigger frame, the common information field carrying information that is common to each user associated with the trigger frame.

25. The wireless communication device of claim 17, wherein the RU guarantee information is carried in a special user information field of the trigger frame, the special user information field being identified by an association identifier (AID) value not assigned to any wireless communication devices associated with a same basic service set (BSS) as the wireless communication device.

26. The wireless communication device of claim 17, wherein the receiving of the RU guarantee information comprises:
receiving a management frame, prior to the trigger frame, that carries the RU guarantee information.

27. The wireless communication device of claim 17, wherein the RU guarantee information comprises a bitmap, each bit of the bitmap indicating whether a respective subchannel of a wireless channel is associated with the one or more guaranteed tones.

28. The wireless communication device of claim 17, wherein the RU guarantee information comprises one or more pairs of bits, each of the one or more pairs of bits indicating which 20 MHz subchannel of a respective 80 MHz channel is associated with the one or more guaranteed tones.

29. A wireless communication device, comprising:
one or more memories that store processor-executable code; and
one or more processors coupled with the one or more memories and configured to, in association with executing the code, cause the wireless communication device to:
transmit a trigger frame soliciting a trigger-based (TB) physical layer convergence protocol (PLCP) protocol data unit (PPDU) from the wireless communication device, the trigger frame including, collectively in a resource unit (RU) allocation subfield of a user information field, RU allocation information indicating a plurality of tones allocated for the TB PPDU and downsizing information indicating whether downsizing of the plurality of tones is permitted, the plurality of tones representing a first RU or a first multiple resource unit (MRU) associated with a wireless medium; and
receive the TB PPDU responsive to the trigger frame and in accordance with whether a portion of the wireless medium is unavailable.

30. The wireless communication device of claim 29, wherein the downsizing information is indicated by a value of a downsizing bit in the user information field.

* * * * *